(12) United States Patent
Katsuramaki

(10) Patent No.: US 10,046,627 B2
(45) Date of Patent: Aug. 14, 2018

(54) SUNROOF FEED STRUCTURE AND SUNROOF UNIT

(71) Applicant: Yazaki Corporation, Tokyo (JP)

(72) Inventor: Takahiko Katsuramaki, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/617,485

(22) Filed: Jun. 8, 2017

(65) Prior Publication Data

US 2017/0368921 A1   Dec. 28, 2017

(30) Foreign Application Priority Data

Jun. 27, 2016 (JP) ................. 2016-126319

(51) Int. Cl.
| B60J 7/057 | (2006.01) |
| B60R 16/02 | (2006.01) |
| B60J 7/043 | (2006.01) |
| B60R 16/03 | (2006.01) |
| B60J 7/053 | (2006.01) |

(52) U.S. Cl.
CPC ............ B60J 7/0573 (2013.01); B60J 7/043 (2013.01); B60J 7/053 (2013.01); B60R 16/0215 (2013.01); B60R 16/03 (2013.01)

(58) Field of Classification Search
CPC ............ B60J 7/05; B60J 7/057; B60J 7/0573
USPC ........................................ 296/211, 221, 223
See application file for complete search history.

(56) References Cited

U.S. PATENT DOCUMENTS 8,336,954 B2 * 12/2012 Yamamoto ............. B60J 7/0573
                                                                174/542

FOREIGN PATENT DOCUMENTS

| EP | 0243839 | * | 4/1987 |
| JP | 2011-151906 A | | 8/2011 |

* cited by examiner

*Primary Examiner* — Dennis H Pedder
(74) *Attorney, Agent, or Firm* — Sughrue Mion, PLLC

(57) ABSTRACT

A sunroof feed structure includes: a rail fixed to a vehicle body of a vehicle; a slider movable along the rail in a front and rear direction of the vehicle; a sunroof supported by the slider, movable inside a ceiling panel of the vehicle body as a movement path, and capable of opening and closing an opening of the ceiling panel; an electric wire for power feeding between the vehicle body and the sunroof, the electric wire having one end fixed to the vehicle body and the other end fixed to the sunroof; and an excess length absorber for winding an excess length of the electric wire, the excess length absorber being movable together with the sunroof in a position rearward of the sunroof in the front and rear direction of the vehicle.

11 Claims, 21 Drawing Sheets

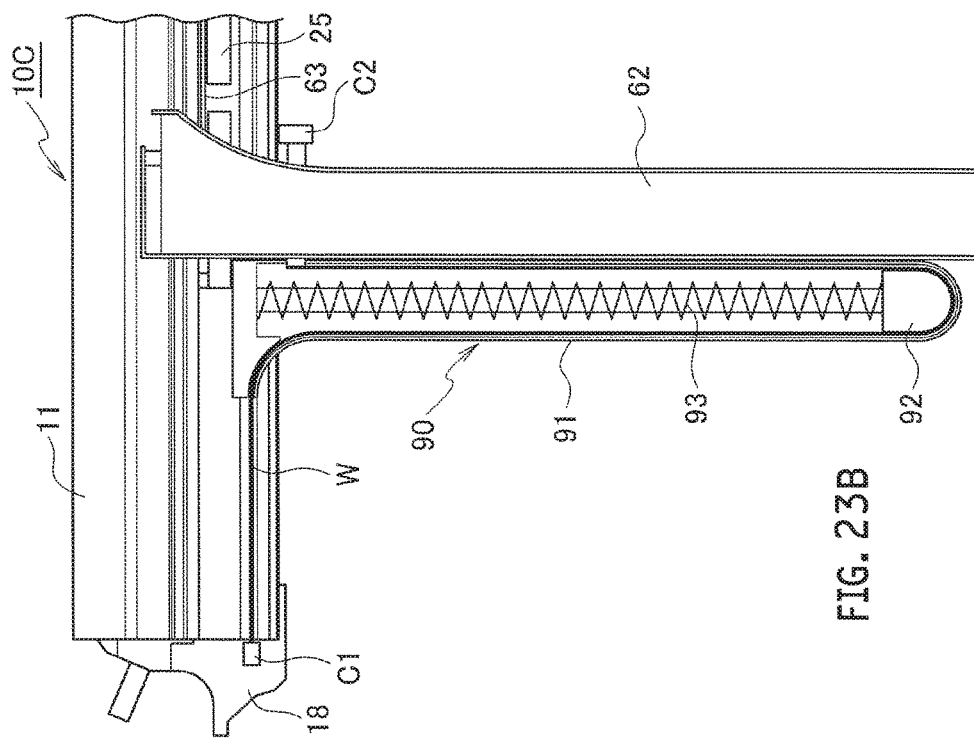
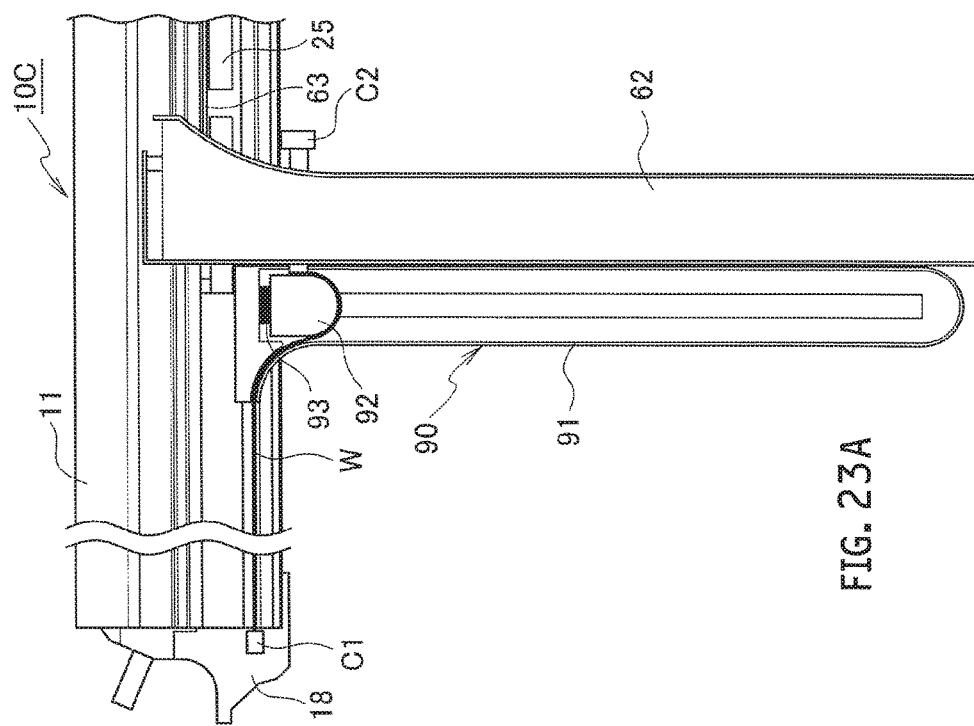

SUNROOF FEED STRUCTURE AND SUNROOF UNIT

CROSS REFERENCE TO RELATED APPLICATION

This application is based upon and claims the benefit of priority from the prior Japanese Patent Application No. 2016-126319, filed on Jun. 27, 2016, the entire contents of which are incorporated herein by reference.

BACKGROUND

1. Technical Field

The disclosure relates to a sunroof feed structure that feeds power between a vehicle body and a sunroof from one to the other, and a sunroof unit.

2. Related Art

JP 2011-151906 A discloses, as shown in FIGS. 1 to 4, a sunroof feed structure of a vehicle that includes a flat wire W, a first excess length absorbing guide case 100 that is fixed to a vehicle body, and a second excess length absorbing guide case 101 that is fixed to a sunroof. The flat wire W has one end fixed to the vehicle body and the other end fixed to the sunroof, and has a length capable of following the movement of the sunroof. As shown in FIG. 4, the flat wire W has an elastic member 102 arranged thereon so that the flat wire W returns to its straight configuration when bent.

In a closed position of the sunroof, as shown in FIG. 1, the first excess length absorbing guide case 100 and the second excess length absorbing guide case 101 are folded on top of each other. In this state, the flat wire W is routed so as to be folded inside the first excess length absorbing guide case 100 and the second excess length absorbing guide case 101. Excess length of the flat wire W is thus absorbed.

In an open position of the sunroof, as shown in FIG. 2, the first excess length absorbing guide case 100 and the second excess length absorbing guide case 101 are spaced apart from each other. In this state, the flat wire W is routed in a straight line due to the property of the elastic member 102 to return to its straight configuration.

In a tilt-up position of the sunroof, as shown in FIG. 3, the first excess length absorbing guide case 100 and the second excess length absorbing guide case 101 are folded on top of each other with one end of the second excess length absorbing guide case 101 raised. In this state, as shown in FIG. 3, the flat wire W is routed so as to be loosely folded inside the first excess length absorbing guide case 100 and the second excess length absorbing guide case 101. Excess length of the flat wire W is thus absorbed.

SUMMARY

In the sunroof feed structure above, it is necessary to attach the first excess length absorbing guide case 100 to the vehicle body and to attach the second excess length absorbing guide case 101 to the sunroof which is troublesome. To provide the vehicle body with excess length absorbing parts of the sunroof feed structure, it is also necessary to make space on the vehicle body for installing the excess length absorbing parts.

It is an object of the disclosure to provide a sunroof feed structure and a sunroof unit which can be attached easily and which do not require space on a vehicle body for installing excess length absorbing parts.

A sunroof feed structure in accordance with some embodiments includes: a rail fixed to a vehicle body of a vehicle; a slider movable along the rail in a front and rear direction of the vehicle; a sunroof supported by the slider, movable inside a ceiling panel of the vehicle body as a movement path, and capable of opening and closing an opening of the ceiling panel; an electric wire for power feeding between the vehicle body and the sunroof the electric wire having one end fixed to the vehicle body and the other end fixed to the sunroof; and an excess length absorber for winding an excess length of the electric wire, the excess length absorber being movable together with the sunroof in a position rearward of the sunroof in the front and rear direction of the vehicle.

The configuration above enables easy attachment since attachment of the excess length absorber to the sunroof eliminates the need to attach excess length absorbing parts to the vehicle body. It is only required that the excess length absorber is provided on the sunroof which also eliminates the need to make space on the vehicle body for installing the excess length absorbing parts. Furthermore, the excess length absorber is provided movable together with the sunroof in the position rearward of the sunroof in the front and rear direction of the vehicle so that it is not exposed from the opening of the ceiling panel. Thus, malfunctioning caused by foreign matter such as rain or dust entering within the excess length absorber is prevented as much as possible.

BRIEF DESCRIPTION OF DRAWINGS

FIG. 23A is a plan view of the excess length absorber according to the fourth embodiment with a sunroof in a closed position.

FIG. 23B is a plan view of the excess length absorber according to the fourth embodiment with the sunroof in an open position.

DETAILED DESCRIPTION

Figure 1:
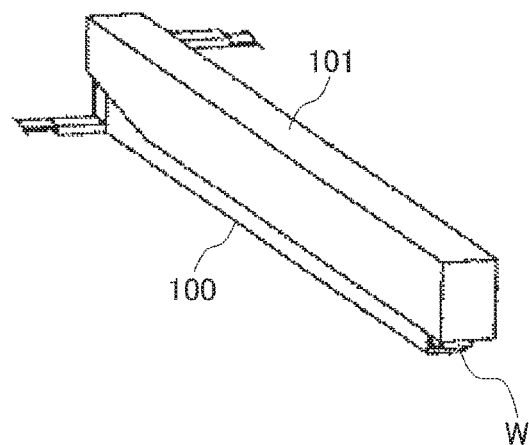
FIG. 1 is a perspective view of a sunroof feed structure according to a related art with a sunroof in a closed position.
Figure 2:
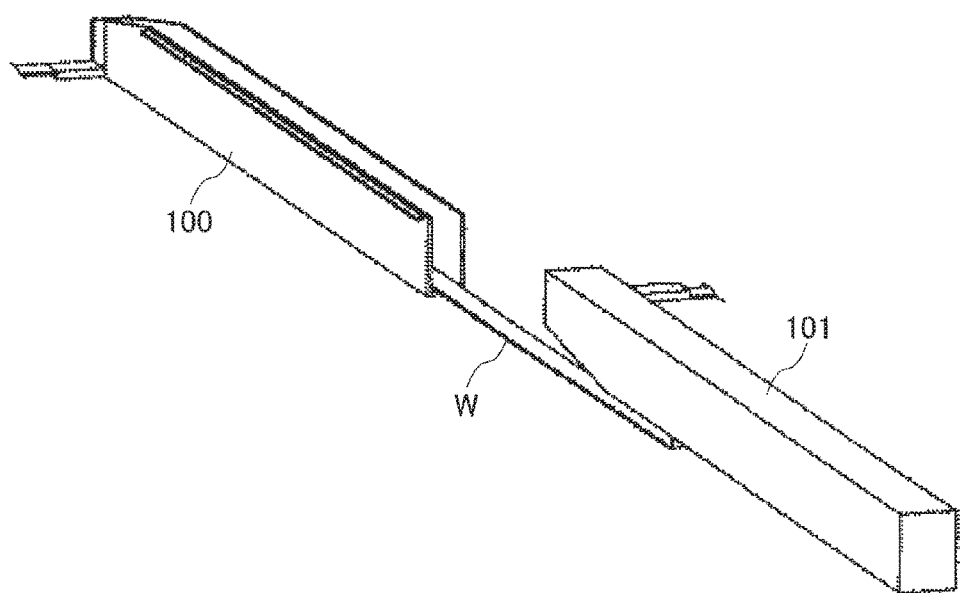
FIG. 2 is a perspective view of the sunroof feed structure according to the related art with the sunroof in an open position.
Figure 3:
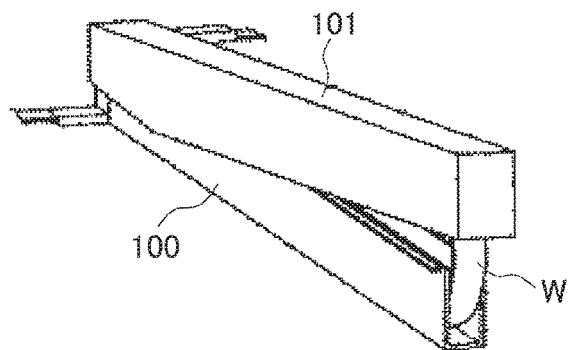
FIG. 3 is a perspective view of the sunroof feed structure according to the related art with the sunroof in a tilt-up position.
Figure 4:
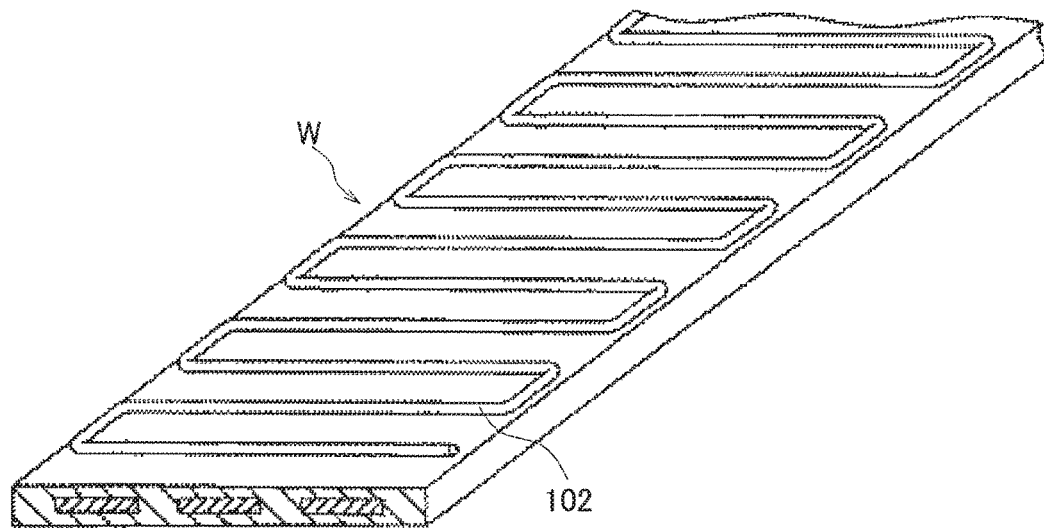
FIG. 4 is a perspective view of a flat wire according to the related art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Embodiments of the present invention will be described below with reference to the drawings.

First Embodiment

A sunroof feed structure according to a first embodiment of the present invention is described with reference to FIGS. 5 to 13B.

As shown in FIGS. 7A to 7C, a vehicle body 1 has a ceiling panel 2 that is provided with an opening 3. The opening 3 is opened and closed by a sunroof unit 10.

The sunroof unit 10 includes, as shown, for example, in FIGS. 5 and 7A to 7C, a pair of rails 11 that are arranged on both sides in a vehicle width direction of the opening 3, a front frame 15 that is arranged on a vehicle front side of the opening 3 and is connected to front ends of the pair of rails 11, a pair of front sliders 21, a pair of rear sliders 23, and a pair of middle sliders 25 that move along the pair of rails 11, a sunroof 30, which is a movable body supported by the pair of middle sliders 25, a pair of drive belts 40 that exerts a moving force on the sunroof 30, an actuator 49, which is a source of movement of the drive belts 40, a deflector 50, a flat wire W, which is an electric wire, and an excess length absorber 70 that winds excess length of the flat wire W.

Figure 5:
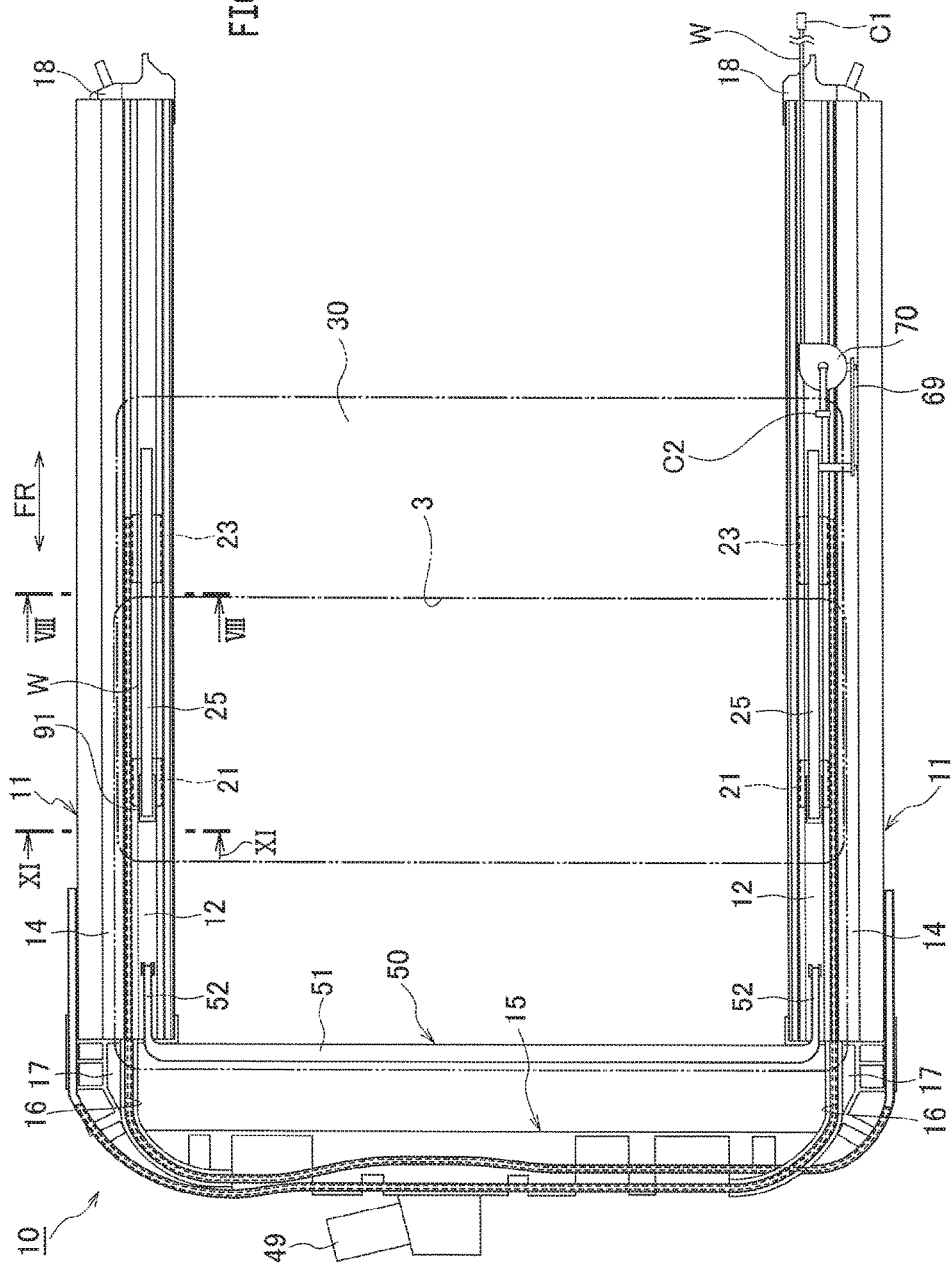
FIG. 5 is a plan view of a sunroof device according to a first embodiment of the present invention with a sunroof in a position between an open position and a closed position.
Figure 6:
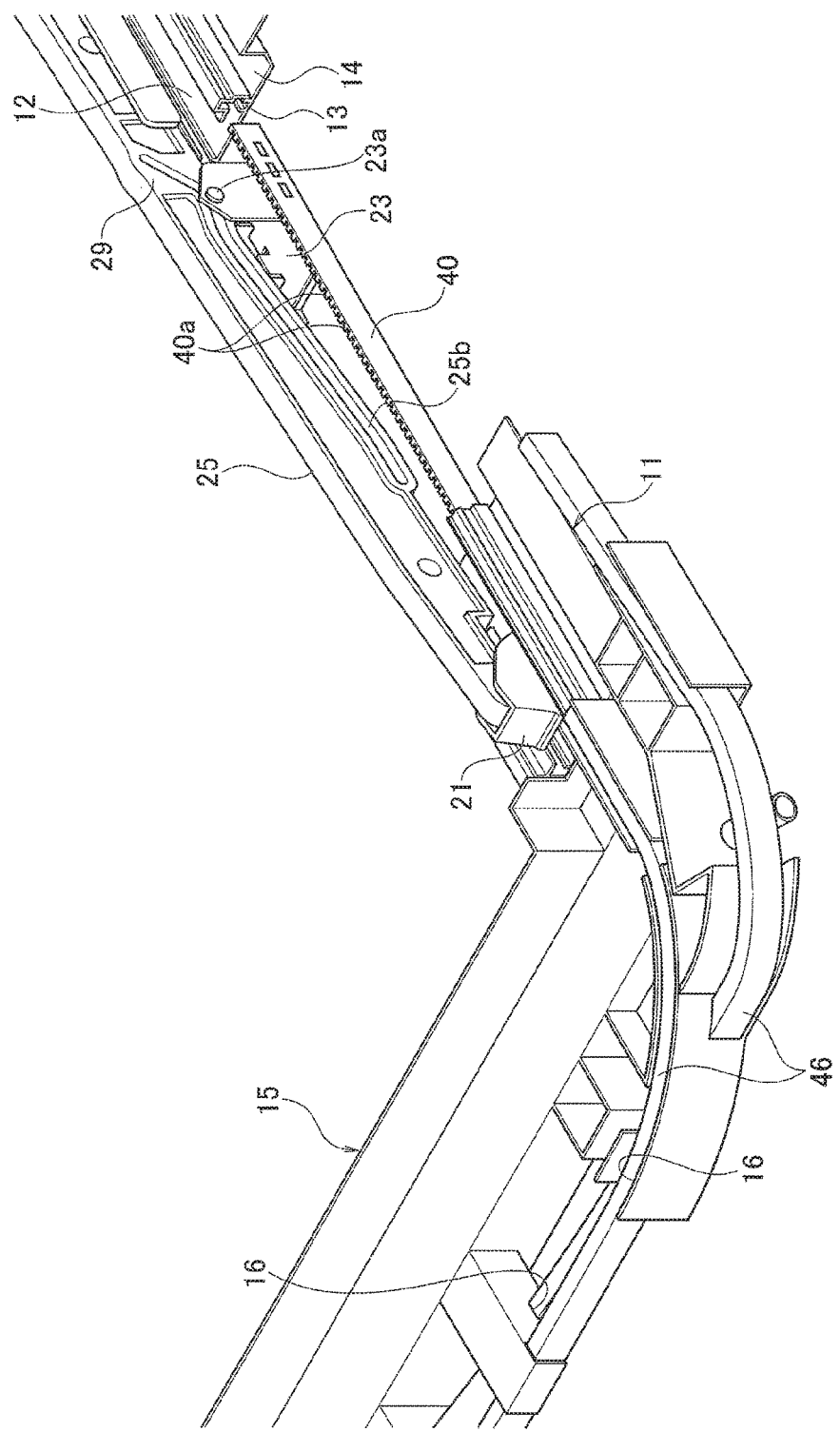
FIG. 6 is a partial perspective view of the sunroof device according to the first embodiment.
Figure 7:
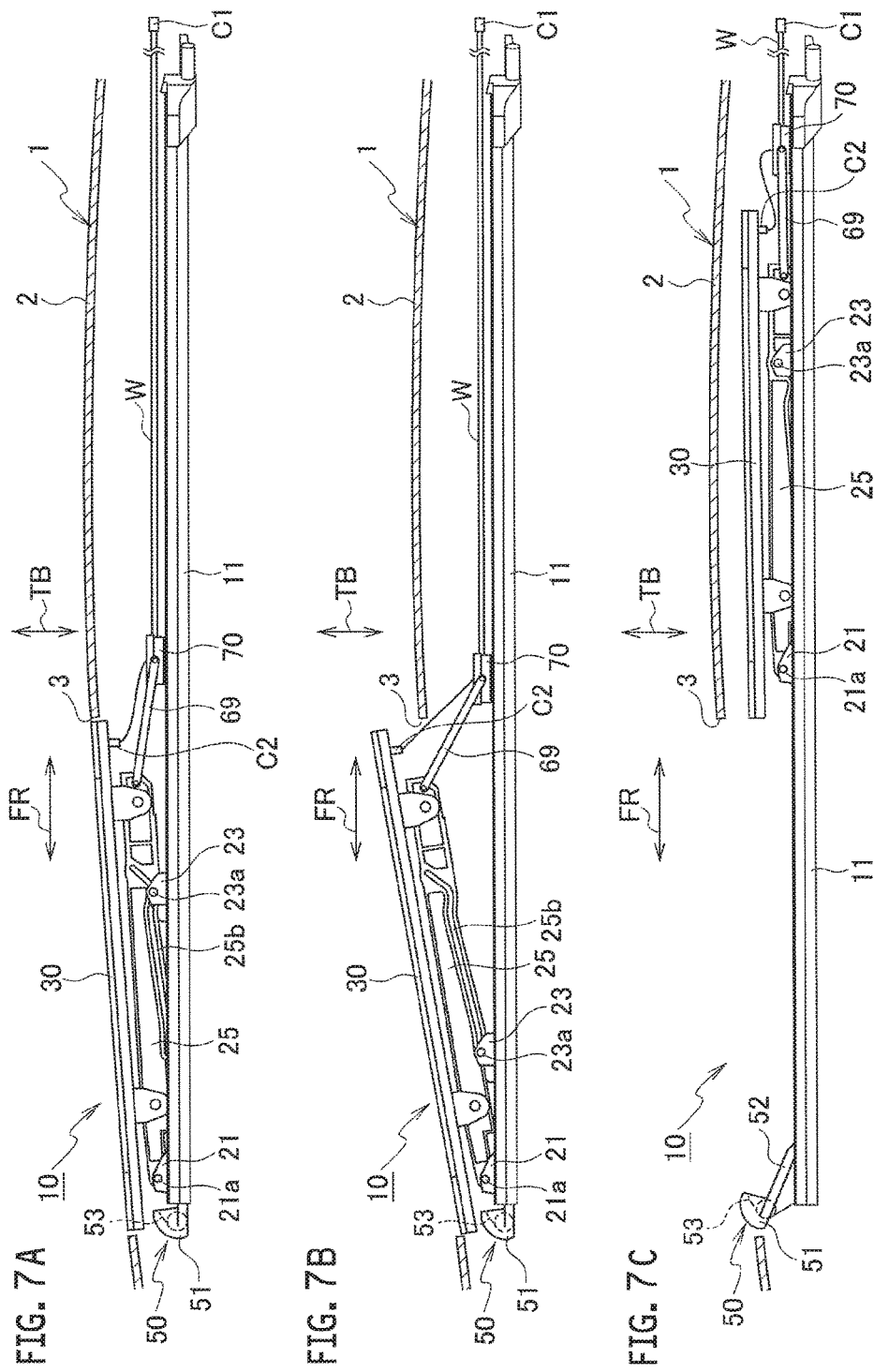
FIG. 7A is a schematic side view showing the sunroof according to the first embodiment positioned in the closed position.
FIG. 7B is a schematic side view showing the sunroof according to the first embodiment positioned in a tilt-up position.
FIG. 7C is a schematic side view showing the sunroof according to the first embodiment positioned in the open position.
Figure 8:
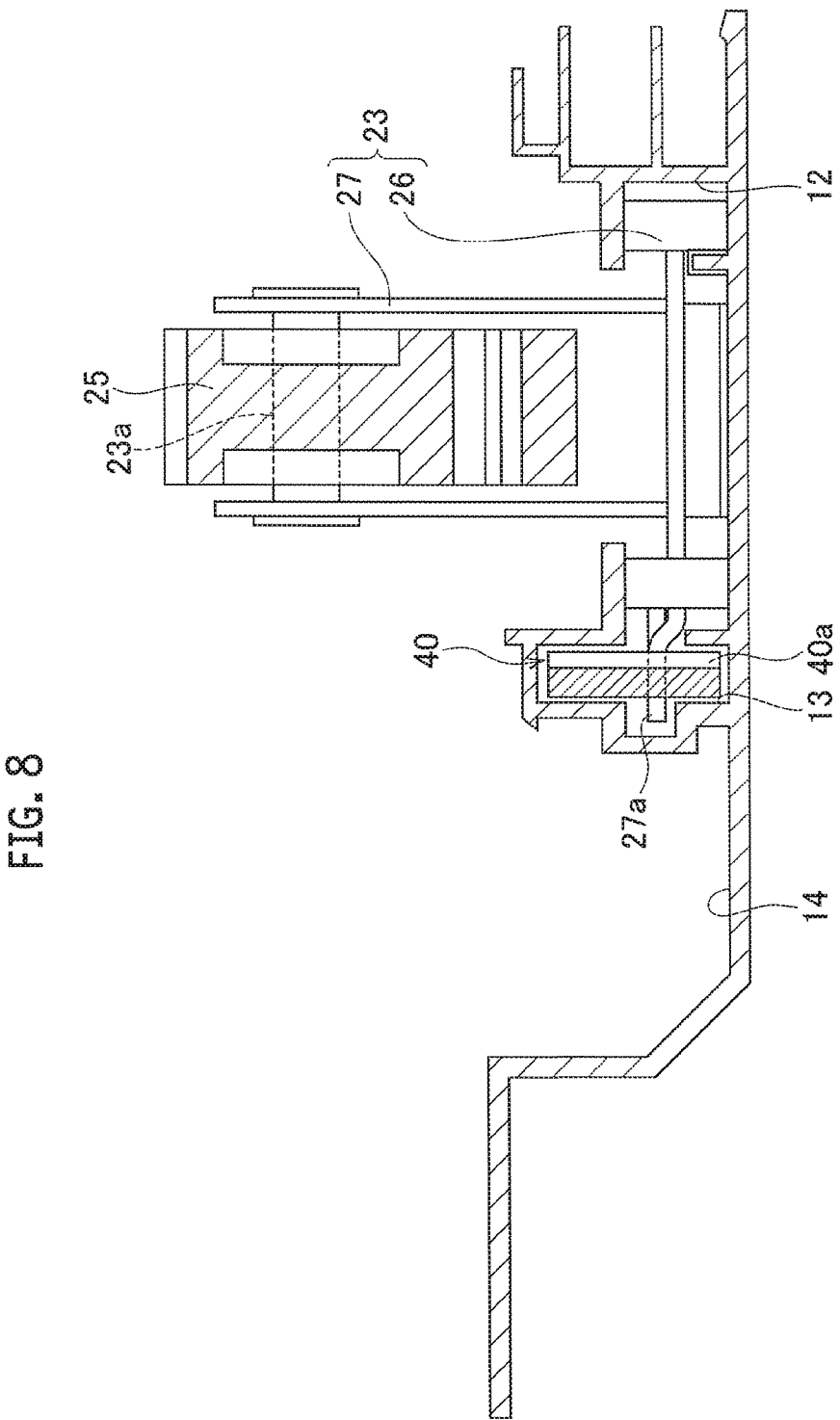
FIG. 8 is a cross-sectional view of a rear slider and a rail according to the first embodiment taken along line VIII-VIII in FIG. 5.
Figure 9:
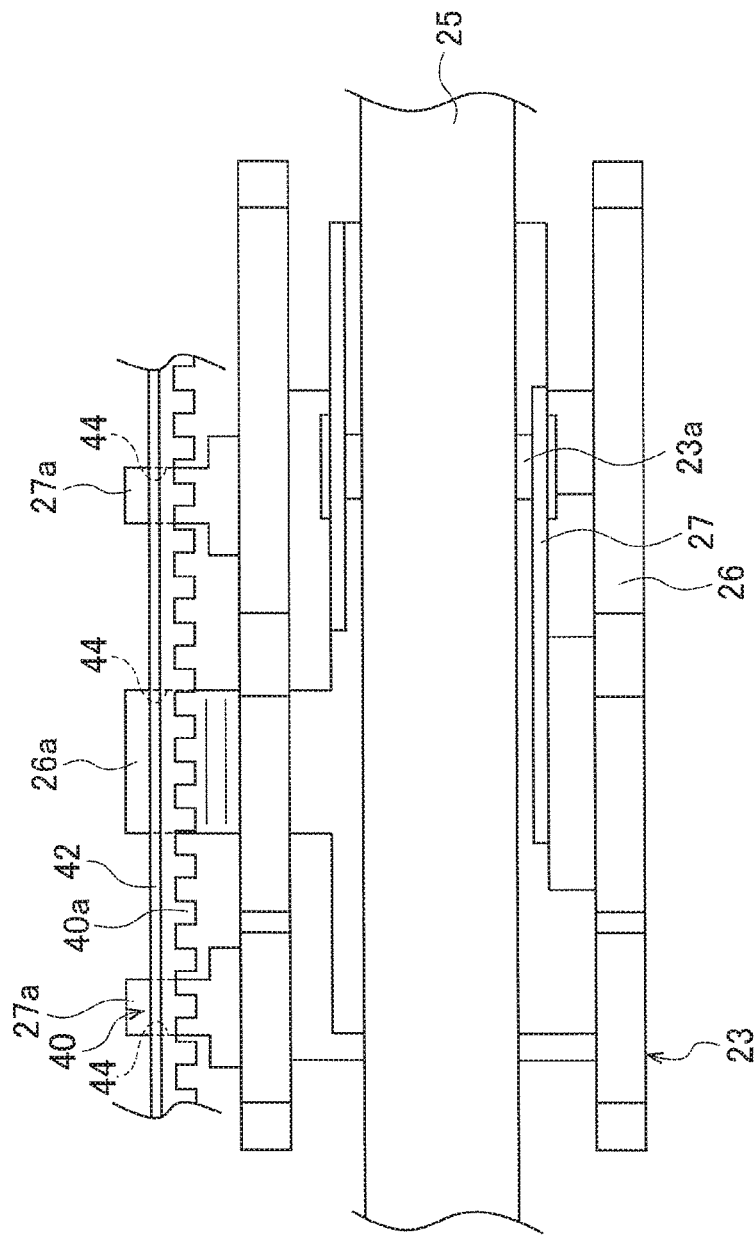
FIG. 9 is a diagram of the rear slider and the rail according to the first embodiment as viewed from above.
Figure 10:
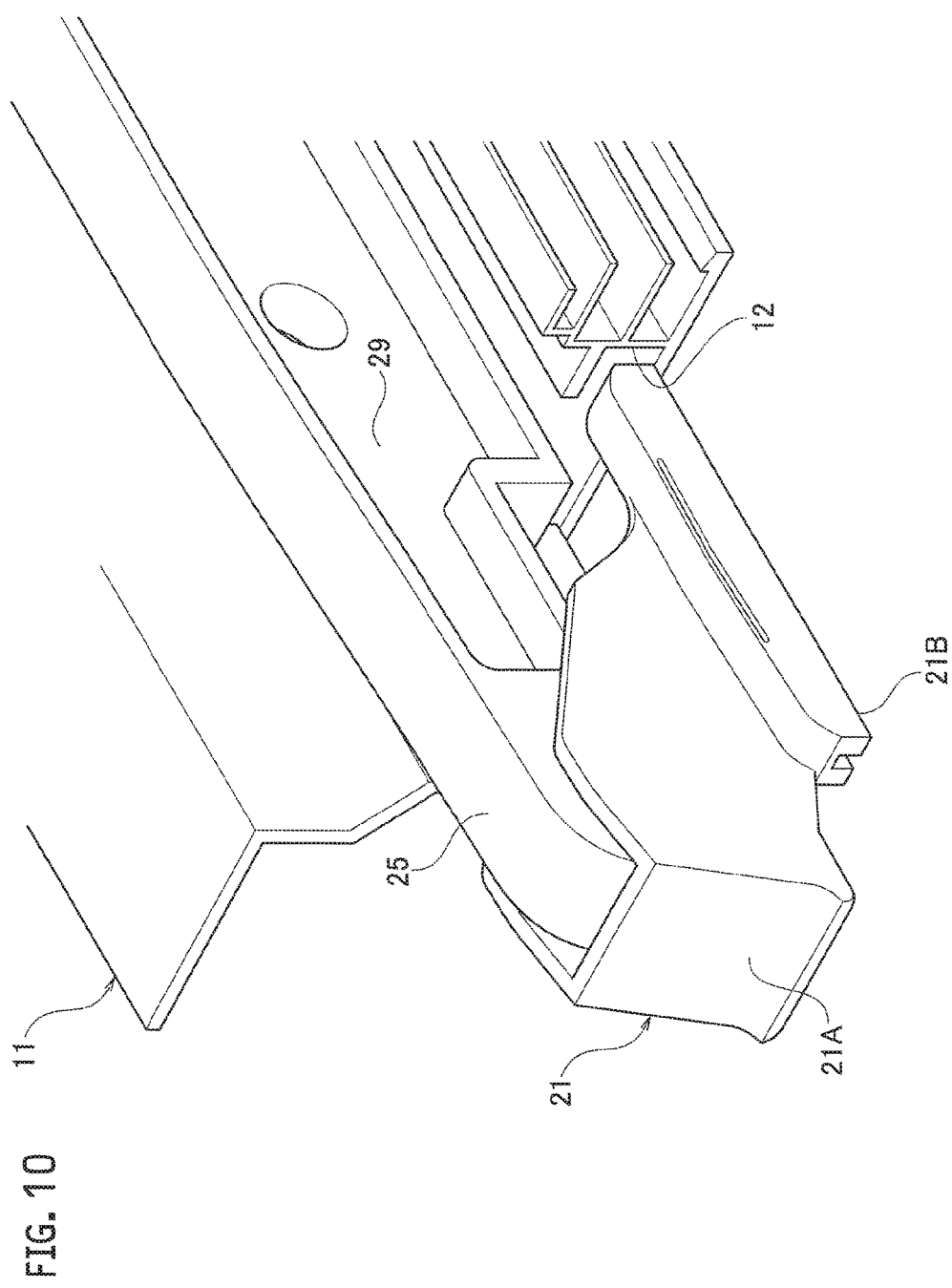
FIG. 10 is a perspective view showing a front slider and the rail according to the first embodiment.
Figure 11:
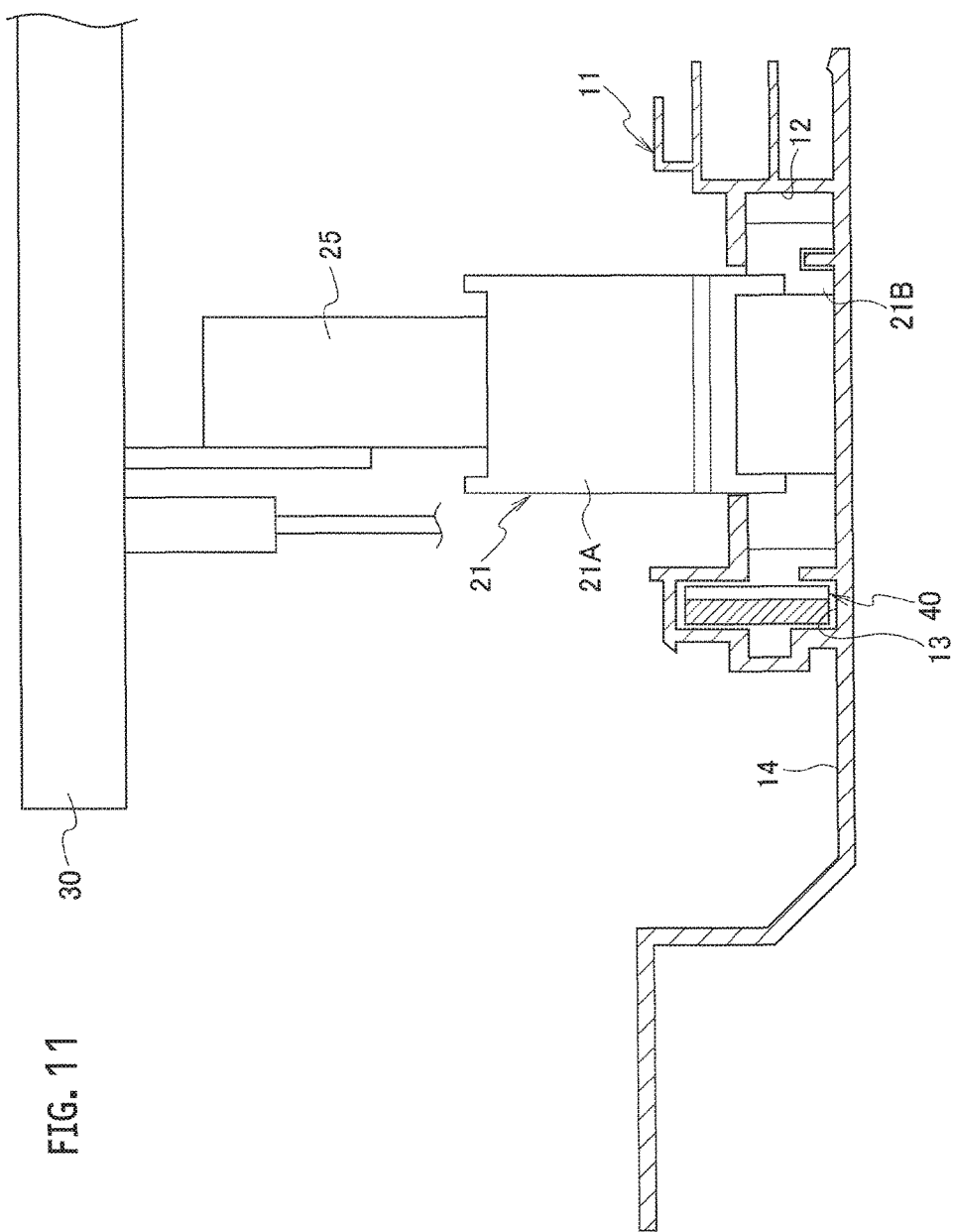
FIG. 11 is a cross-sectional view of the front slider and the rail according to the first embodiment taken along line XI-XI in FIG. 5.

As shown, for example, in FIGS. 5, 6, and 8, the rails 11 are formed, for example, of aluminum alloy. Each rail 11 has a slide guide channel 12, a belt guide channel 13, and a drainage channel 14 arranged in a width direction thereof. The slide guide channel 12, the belt guide channel 13, and the drainage channel 14 are extended longitudinally along each rail 11.

The belt guide channels 13 positioned on the left and right in the vehicle width direction are located outside the slide guide channels 12 in the vehicle width direction. The drainage channels 14 positioned on the left and right in the vehicle width direction are located outside the belt guide channels 13 in the vehicle width direction. The drainage channels 14 positioned on the left and right in the vehicle width direction are located directly below gaps between left and right sides of the sunroof 30 and the ceiling panel 2 and receive, for example, water that falls from the gaps. Each drainage channel 14 has a concave groove shape with an open upper side. A drainage cap 18 is attached to a vehicle rear end position of each channel 14 of the rails 11 (shown in FIG. 5). A drainage hose (not shown) is connected to the drainage cap 18.

The front frame 15 is formed, for example, of a synthetic resin material. The front frame 15 is provided with two belt routing channels 16 and a left and right pair of drainage channels 17. Each belt routing channel 16 is continuous with each belt guide channel 13 of the rails 11. Each drainage channel 17 is continuous with each drainage channel 14 of the rails 11. A drainage cap (not shown) is connected to a vehicle front end position of each drainage channel 17 of the front frame 15. A drainage hose (not shown) is connected to the drainage cap.

As shown, for example, in FIGS. 5, 6, and 7A to 7C, the pair of front sliders 21 and the pair of rear sliders 23 are slidably arranged on the slide guide channels 12 of the left and right rails 11 in the same position in a front and rear direction FR of the vehicle. Each of the pair of middle sliders 25 has a rotation support hole (not specifically labeled) located toward the vehicle front end thereof and a longitudinally elongated cam hole 25b. A rotation pin 21a of each of the pair of front sliders 21 is inserted into the rotation support hole on the vehicle front end of each middle slider 25. A cam pin 23a of each of the pair of rear sliders 23 is inserted into the elongated cam hole 25b of each middle slider 25. The pair of middle sliders 25 moves in unison with the pair of front sliders 21 during movement in the front and rear direction FR of the vehicle. The pair of middle sliders 25 moves in the front and rear direction FR of the vehicle and a top and bottom direction TB of the vehicle with respect to the pair of rear sliders 23 according to the positions of the cam pins 23a in the cam holes 25b. Such a slider mechanism enables the sunroof 30 to change between a closed position that covers the opening 3 as shown in FIG. 7A, a tilt-up position that closes the front of the opening 3 and opens the rear of the opening 3 as shown in FIG. 7B, and an open position that opens the opening 3 as shown in FIG. 7C.

As shown in FIG. 5, the sunroof 30 is attached to the pair of middle sliders 25. The sunroof 30 has a laminated panel body in which at least a transparent glass body and a dimming panel are laminated. When a voltage is not applied, the dimming panel is in an opaque state, and when a voltage is applied, the dimming panel changes transparency according to the applied voltage level. The dimming panel is powered from a side of the vehicle body 1, the feed mechanism of which will be described later.

The drive belts 40 are formed of a synthetic resin. The drive belts 40 are elongated and have a vertical rectangle cross-section. The drive belts 40 are provided on one surface with teeth 40a in succession in the longitudinal direction. Each drive belt 40 is arranged in each belt routing channel 16 of the front frame 15 and in each belt guide channel 13 of the pair of rails 11. Each drive belt 40 is covered with a belt cover 46 in a region of the belt routing channel 16 of the front frame 15 and with a belt enclosing wall (not specifically labeled) in a region of the belt guide channel 13 of the rails 11 so as not to buckle (deflect) easily. Thus, the pair of drive belts 40 moves only along a predetermined path even when pushing the sunroof 30 from the front to the rear of the vehicle.

One end of each of the pair of drive belts 40 is fixed to each of the pair of rear sliders 23 (one of the drive belts 40 is fixed to one of the rear sliders 23 and the other drive belt 40 is fixed to the other rear slider 23), and the other end is not fixed to any member, that is, it is a free end.

The actuator 49 (shown in FIG. 5) is fixed to a substantially central position in the vehicle width direction of the front frame 15. A pair of output gears (not shown) of the actuator 49 meshes with the teeth 40a of the pair of drive belts 40. The pair of output gears rotate in an opposite direction to each other. Thus, the pair of drive belts 40 moves in an opposite direction to each other and the pair of rear sliders 23 moves in synchronization with each other in the same position in the front and rear direction FR of the vehicle.

The deflector 50 includes a deflector body 51 and a pair of swing arms 52 that is rotatably supported at left and right ends of the deflector body 51. The deflector body 51 is arranged across the vehicle width direction of the opening 3 at a front end of the opening 3 of the ceiling panel 2. The deflector body 51 has an arc-shaped front end. Thus, when the opening 3 is open, strong wind from outside does not directly enter a cabin from the opening 3.

The pair of swing arms 52 is rotatably supported by the pair of rails 11. The deflector body 51 is changeable, due to movement of the pair of swing arms 52, between a standby position (positions in FIGS. 7A and 7B) in which the deflector body 51 is positioned below the opening 3 of the ceiling panel 2 and a wind shield position (position in FIG. 7C) in which the deflector body 51 projects above the ceiling panel 2 from the opening 3. The deflector body 51 is biased toward the wind shield position by a spring force of a torsion spring 53. The deflector body 51 is positioned on slide paths of the front sliders 21 and when the front sliders 21 are in the closed position of FIG. 7A and the tilt-up position of FIG. 7B, the pair of swing arms 52 receives a pressing force from the front sliders 21 causing the deflector body 51 to be positioned in the standby position against the spring force of the torsion spring 53. When the front sliders 21 are in the open position of FIG. 7C, the pair of swing arms 52 does not receive the pressing force from the front sliders 21 so that the deflector body 51 is positioned in the wind shield position by the spring force of the torsion spring 53.

A fixing structure of the drive belts 40 and the rear sliders 23 will now be described. As is shown in detail in FIGS. 8 and 9, each rear slider 23 includes a resin block 26 and an insulating metal bracket 27 fitted thereto. The portion of the resin block 26 is arranged in the slide guide channel 12. The resin block 26 is provided with a fitting projection 26a in one place, and the metal bracket 27 is provided with a fitting projection 27a in two places. The two fitting projections 27a of the metal bracket 27 are arranged on opposite sides in the vehicle front and rear direction FR of the fitting projection 26a of the resin block 26. Each drive belt 40 has, on one end, fitting holes 44 in positions that correspond to the fitting projections 26a, 27a. Each drive belt 40 and each rear slider 23 are connected by the fitting projections 26a, 27a of the resin block 26 and the metal bracket 27 being fitted into the fitting holes 44 of the drive belt 40.

The feed structure from the side of the vehicle body 1 to the sunroof 30 will now be described. As shown, for example, in FIGS. 5 and 12, the sunroof feed structure includes the flat wire W that is routed along the rails 11 and the excess length absorber 70 that is arranged along a routing path of the flat wire W and absorbs an excess length of the flat wire W.

The flat wire W has a connector C1 at one end that is connected to a connector (not shown) on the vehicle body 1 and a connector C2 at the other end that is connected to a connector (not shown) on the sunroof 30. The flat wire W is a flexible flat cable. The flat wire W has an insulating layer the periphery of which is further coated with a protective layer.

As shown in FIGS. 7A to 7C, the excess length absorber 70 is fixed to the sunroof 30. Specifically, the excess length absorber 70 is connected to a rear end of one of the middle sliders 25 through a link 69. The link 69 is rotatably supported by both the middle slider 25 and the excess length absorber 70. Thus, the link 69 swings due to up and down movements of the middle slider 25. The excess length absorber 70 is arranged in a position rearward of the sunroof 30 in the front and rear direction FR of the vehicle and is provided movable together with the sunroof 30. The excess length absorber 70 is supported by the middle slider 25 to move inside the ceiling panel 2 of the vehicle body 1 as its movement path.

Figure 12:
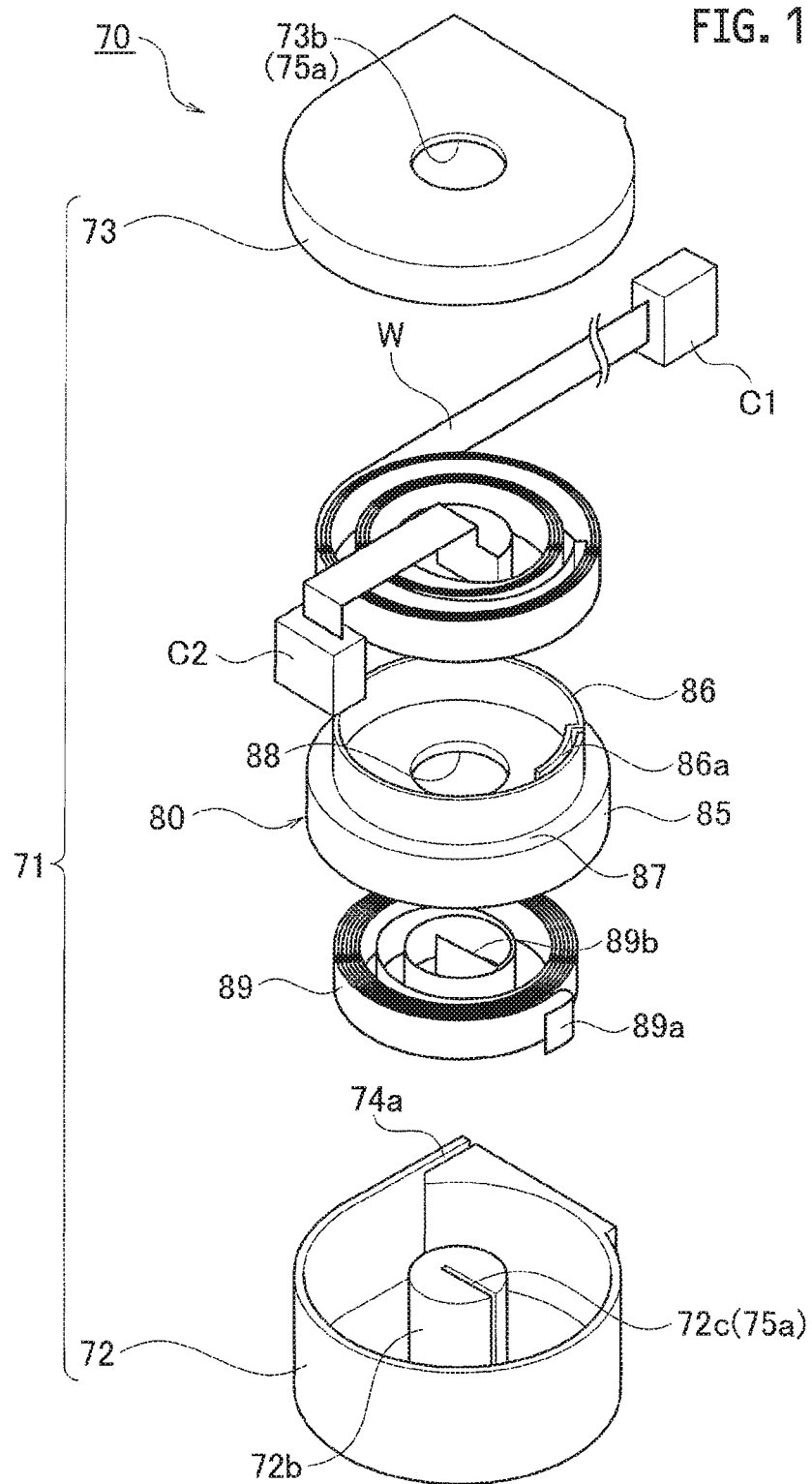
FIG. 12 is a perspective view of an excess length absorber according to the first embodiment.
Figure 13A:
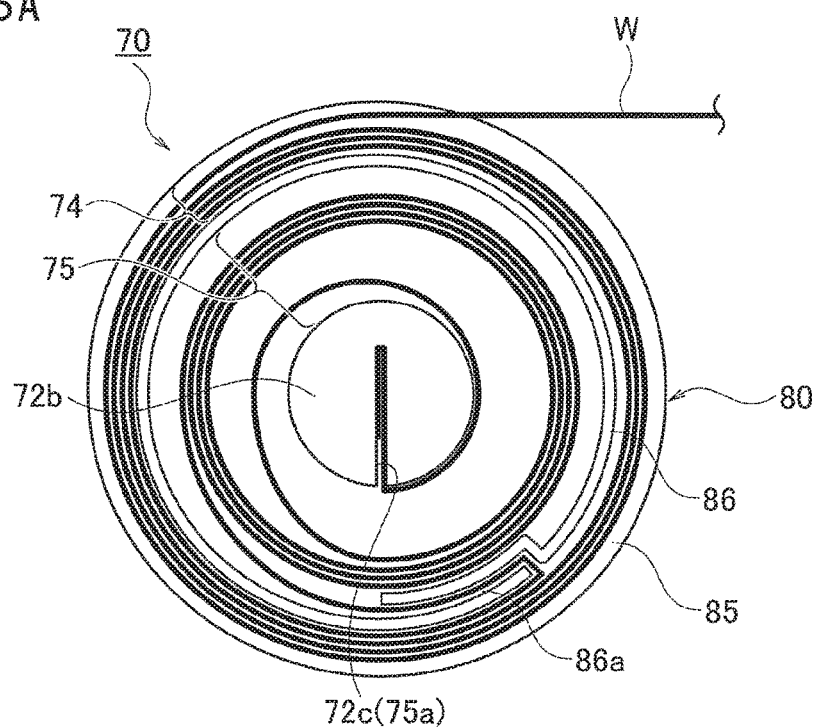
FIG. 13A is a side view of the excess length absorber according to the first embodiment with one of divided casings removed.
Figure 13B:
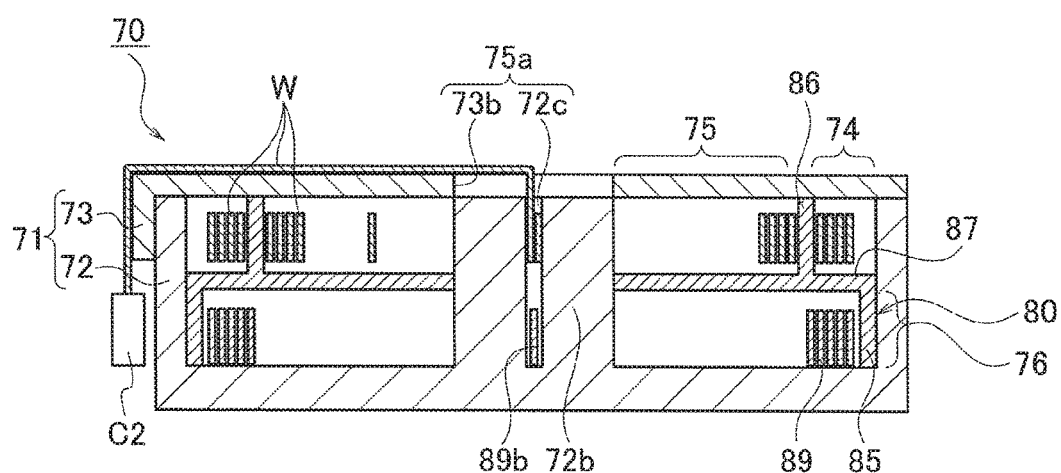
FIG. 13B is a longitudinal cross-sectional view of the excess length absorber according to the first embodiment.

The excess length absorber 70 includes, as shown in FIGS. 12, 13A, and 13B in detail, a case 71, a rotating body 80 that is contained within the case 71, and a spiral spring 89, which is a biasing means arranged inside the case 71.

The case 71 is slidably supported by one of the rails 11. The case 71 is generally cylindrical with both side surfaces closed and includes two divided casings 72, 73 that are assembled to each other. The divided casing 72 is provided with a rotation support shaft 72b that rotatably supports the rotating body 80. The divided casing 73 is provided with a rotation support hole 73b that supports a distal end of the rotation support shaft 72b. The case 71 is divided, along an axis of the rotation support shaft 72b, into an electric wire housing portion (an electric wire excess length housing portion 74 and a twist-preventing electric wire housing portion 75) and a spring housing portion 76, as shown in FIGS. 13A and 13B. The electric wire excess length housing portion 74 and the twist-preventing electric wire housing portion 75 are arranged in the same position along the axis of the rotation support shaft 72b with the electric wire excess length housing portion 74 arranged on an outer circumferential side and the twist-preventing electric wire housing portion 75 arranged on an inner circumferential side.

The electric wire excess length housing portion 74 is provided with a first electric wire outlet 74a from which an end of the flat wire W fixed to the vehicle body 1 is drawn out. The twist-preventing electric wire housing portion 75 is provided with a second electric wire outlet 75a from which an end of the flat wire W to be fixed to the sunroof 30 is drawn out.

The first electric wire outlet 74a is provided on an outer circumferential wall of the divided casing 72. The second electric wire outlet 75a is formed with a slit 72c in the rotation support shaft 72b and the rotation support hole 73b of the divided casing 73.

The rotating body 80 is formed from a unitary member. The rotating body 60 includes a circular rotation guide circumferential wall 85 that is slightly smaller than an inner diameter of the divided casing 72, an electric wire winding circumferential wall 96 that is provided in a position shifted in an axial direction of the rotation support shaft 72b relative to the rotation guide circumferential wall 85, a side wall 87 that connects the rotation guide circumferential wall 85 and the electric wire winding circumferential wall 86, and a rotation guide hole 88 that is opened in the center of the side wall 87 and through which the rotation support shaft 72b passes. The rotating body 80 is rotatably supported by the case 71 (divided casings 72, due to the rotation guide circumferential wall 85 being guided by an inner circumferential wall of the divided casing 72 and the rotation guide hole 88 being guided by the rotation support shaft 72b of the divided casing 72.

The electric wire winding circumferential wall 86 of the rotating body 80 has a slit 86a that communicates with the inner circumferential twist-preventing electric wire housing portion 75 and the outer circumferential electric wire excess length housing portion 74.

The flat wire W to be fixed to the vehicle body 1 is inserted into the slit 86a from a side of the electric wire excess length housing portion 74. The flat wire W of the side of the vehicle body 1 is drawn out of the case 71 from the first electric wire outlet 74a while being windable around the electric wire winding circumferential wall 86.

The flat wire W that is inserted into the slit 86a and fixed is drawn out from the slit 86a into the twist-preventing electric wire housing portion 75. The drawn out flat wire W is wound around the rotation support shaft 72b inside the twist-preventing electric wire housing portion 75 in a direction opposite a winding direction in the electric wire excess length housing portion 74 (the winding direction of the flat wire W of the side, of the vehicle body 1) with a distal end being drawn out of the case 71 from the second electric wire outlet 75a. The second electric wire outlet 75a is formed with the slit 72c in the rotation support shaft 72b and the rotation support hole 73b.

A spiral wire length inside the twist-preventing electric wire housing portion 75 is set to a length such that at least an excess length absorbing amount of the flat wire W can be absorbed by changing the spiral form (a loosely wound spiral and a tightly wound spiral).

The spiral spring 89 is ranged inside the spring housing portion 76. The spiral spring 89 has an outer peripheral end 89a (shown in FIG. 12) that is latched to the rotating body 80 and an inner peripheral end 89b (shown in FIG. 12) that is latched to the rotation support shaft 72b. The spiral spring 89 biases the rotating body 80 and hence the electric wire winding circumferential wall 86 in the winding direction of the flat wire W of the side of the vehicle body 1.

The divided casing 72 is slidably supported by one of the rails 11.

In the above configuration, when the actuator 49 activates, the pair of drive belts 40 moves so that, at one end, the pair of drive belts 40 are in the same position in the front and rear direction FR of the vehicle, thereby enabling the sunroof 30 to be changed to the three positions shown in FIGS. 7A to 7C.

In a movement process of the sunroof 30 in a slide direction, when the sunroof 30 is moved to increase the excess length of the flat e W (for example, when moved from the closed position of the sunroof 30 in FIG. 7A to the open position in FIG. 7C), the rotating body 80 rotates due to the spring force of the spiral spring 89 and the excess length of the flat wire W is wound by an electric wire winding circumferential wall 86. In the movement process of the sunroof 30 in the slide direction, when the sunroof 3 is moved to reduce the excess length of the flat wire W (for example, when moved from the open position of the sunroof 30 in FIG. 7C to the closed position in FIG. 7A), the rotating body 80 rotates against the spring force of the spiral spring 89 and the excess length of the flat wire W is drawn out from the electric wire winding circumferential wall 86. Thus, the excess length of the flat wire W is reliably absorbed while a straight routing state is maintained for the portion of the flat wire W other than the excess length.

Inside the excess length absorber 70 during such sliding movement processes of the sunroof 30, when the rotating body 80 is rotated in the direction in which the flat wire W of the side of the vehicle body 1 is wound, the flat wire W in the twist-preventing electric wire housing portion 75 changes its winding form to reduce the number of windings thereof. When the rotating body 80 is rotated in the direction in which the flat wire W of the side of the vehicle body 1 is drawn out, the flat wire W in the twist-preventing electric wire housing portion 75 changes its winding form to increase the number of windings thereof. Thus, only the winding form of the flat wire W in the twist-preventing electric wire housing portion 75 is changed to prevent twist (rotation) from occurring in the portion of the flat wire W drawn out from the twist-preventing electric wire housing portion 75.

Power is thus constantly supplied to the sunroof 30 from a power source on the vehicle body 1 through the flat wire W for the changes between the three positions of the sunroof 30.

As described above, attaching the excess length absorber 70 to the sunroof 30 eliminates the need to attach excess length absorbing parts to the vehicle body 1, which configuration enables easy attachment. Since the excess length absorber 70 is provided on the sunroof 30, the need to make space on the vehicle body 1 for installing the excess length absorbing parts is also eliminated. Furthermore, the excess length absorber 70 is provided movable together with the sunroof 30 in the position rearward of the sunroof 30 in the front and rear direction of the vehicle so that it is not exposed from the opening 3 of the ceiling panel 2. Thus, malfunctioning caused by foreign matter such as rain or dust entering within the excess length absorber 70 is prevented as much as possible.

The excess length absorber 70 includes the rotating body 80 that has the electric wire winding circumferential wall 86 which winds the flat wire W on a stationary portion (vehicle body 1) side of a changing point of the winding direction positioned along the flat wire W, the spiral spring 89 that biases the rotating body 80 in the winding direction of the flat wire W of the stationary portion (vehicle body 1) side, and the twist-preventing electric wire housing portion 75 that houses the part of the flat wire W on a movable body (sunroof 30) side of the changing point that is wound in the direction opposite the winding direction of the flat wire N of the electric wire winding circumferential wall 86. Due to this configuration, and because, for example, attaching the excess length absorber 70 to the movable body (sunroof 30) side eliminates the need to attach the excess length absorbing parts to the stationary portion (vehicle body 1) side, attachment is easy. The excess length absorber 70 is provided with the rotating body 80 (electric wire winding circumferential wall 86) that winds the flat wire W, the spiral spring 89 which is a biasing means that biases the rotating body 80, and the twist-preventing electric wire housing portion 75 that winds the flat wire W in the direction opposite the winding direction of the rotating body 80, all of which are arranged centered about a center of rotation, thereby enabling a compact configuration.

The excess length absorber 70 has only the rotating body 80 and the spiral spring 89 that biases the rotating body 80 arranged therein, which configuration enables a simple structure. Thus, a movable body feed structure that is attached easily and has a structure that is as simplified as possible is provided.

The rotating body 80 has the electric wire winding circumferential wall 86. The changing point of the winding direction of the flat wire W is inserted into a slit 86a that is formed in the electric wire winding circumferential wall 86. The flat wire W of the side of the vehicle body 1 drawn out from the slit 86a and the flat wire W of the side of the sunroof 30 drawn out from the slit 86a have different winding directions to each other. Thus, during the sliding movement of the sunroof 30, only the winding form of the flat wire W in the twist-preventing electric wire housing portion 75 is changed to prevent twist (rotation) from occurring in the portion of the flat wire W drawn out from the twist-preventing electric wire housing portion 75. Damages, conducting defects, or the like of the flat wire W due to twist are prevented so that durability and connection reliability of the flat wire W is maintained. The winding direction of the flat wire W is changed by inserting the changing point of the winding direction of the flat wire W into the slit 86a. Thus, the winding direction of the flat wire W is changed with a simple configuration.

The electric wire excess length housing portion 74 in which the flat wire W of the side of the vehicle body 1 is wound around the electric wire winding circumferential wall 86 and housed, and the twist-preventing electric wire housing portion 75 in which the flat wire W of the side of the sunroof 30 is housed in a wound state are set adjoining each other in positions shifted in the radial direction of the rotation support shaft 72b. Accordingly, this enables compactness of the excess length absorber 70.

In the first embodiment, the electric wire excess length housing portion 74 that houses the excess length of the flat wire W and the twist-preventing electric wire housing portion 75 that houses the flat wire W to prevent twist of the flat wire W are arranged in the same position in the axial direction of the rotating body 80 and adjoining each other on the outer circumferential side and the inner circumferential side. Thus, a width dimension of the excess length absorber 70 (width dimension of the rotating body 80) is short.

Second Embodiment

A second embodiment of the present invention is described with reference, for example, to FIGS. 14 to 16. A sunroof unit 10A according to the second embodiment has a water receiver 60 added thereto compared to the first embodiment.

The water receiver 60 is arranged across the vehicle width direction of the opening 3 at a rear end of the opening 3. The water receiver 60 includes slide portions (not shown) that are slidably supported by the pair of rails 11, a water receiving body 62 that is supported by the slide portions and has a water receiving groove (not shown), and a pair of arms 63 that is fixed to both ends in the vehicle width direction of the water receiving body 62. The water receiving groove (not shown) of the water receiving body 62 has water outlets (not shown) formed in each of positions directly above the drainage channels 14 of the pair of rails 11. Distal ends of the pair of arms 63 are rotatably supported by the middle sliders 25. The water receiver 60 moves following movement of the middle sliders 25 in the front and rear direction FR of the vehicle and up-down movement of rear ends of the middle sliders 25.

The water receiving body 62 of the water receiver 60 is positioned at the rear end of the opening 3 when the sunroof 30 is in the closed position (position in FIG. 7A) and receives, for example, water that falls from the gaps between the sunroof 30 and the ceiling panel 2. The water receiving body 62 is positioned at the rear end of the opening 3 when the sunroof 30 is in the tilt-up position (position in FIG. 7B) and receives, for example, water that falls from the opening 3. The water receiving body 62 is positioned in a retracted position inside the ceiling panel 2 when the sunroof 30 is in the open position (position in FIG. 7C). The water, and the like received in the water receiving body 62 falls onto the drainage channels 14 of the rails 11 from the water outlets (not shown), flows along the drainage channels 14 of the rails 11 toward front ends or rear ends thereof, and is drained outside by the drainage hoses (not shown) via the drainage caps 18 (and the drainage caps not shown).

Figure 14:
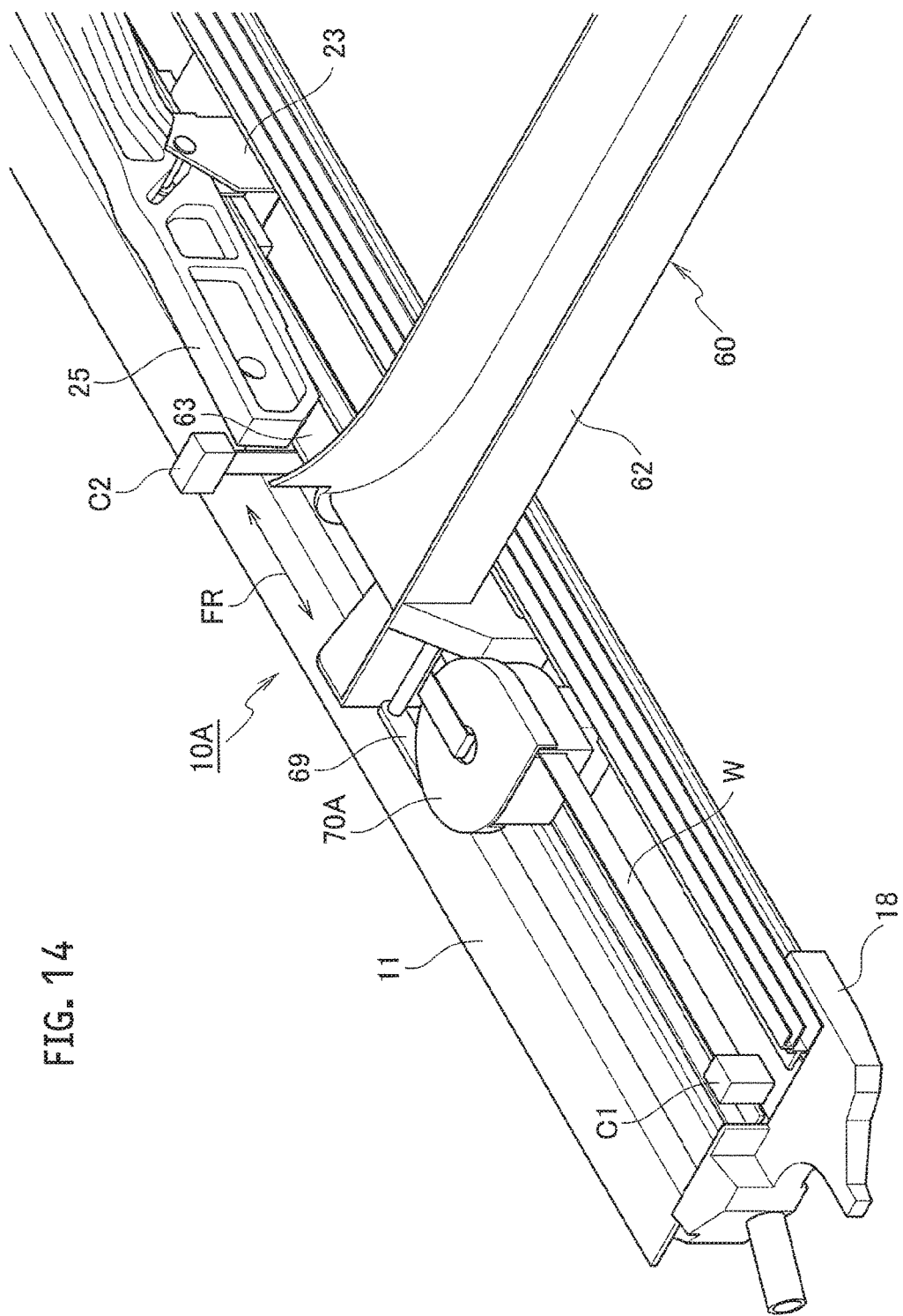
FIG. 14 is a perspective view of an excess length absorber according to a second embodiment of the present invention in an attached state.
Figure 15:
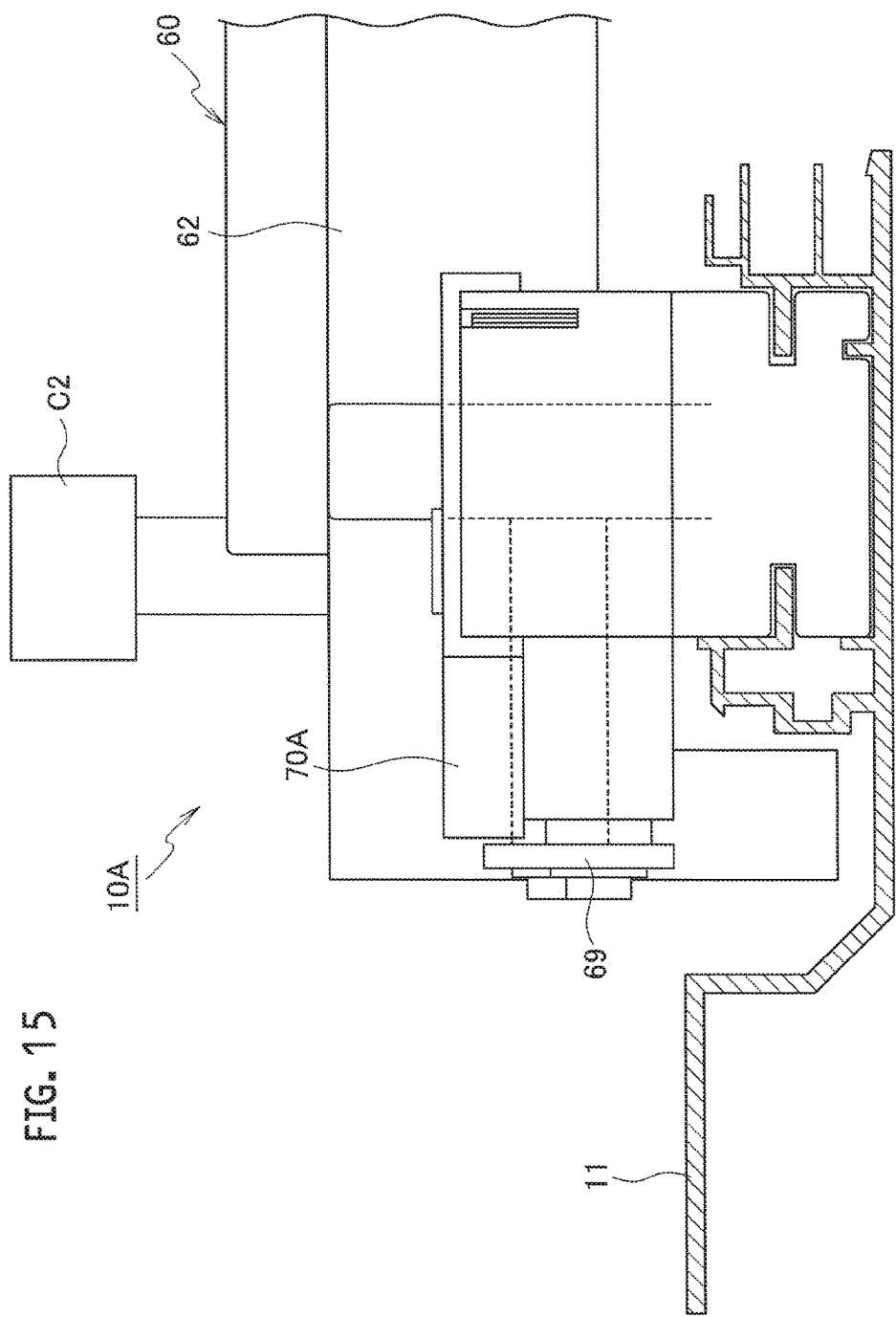
FIG. 15 is a rear view of the excess length absorber according to a second embodiment in the attached state.
Figure 16:
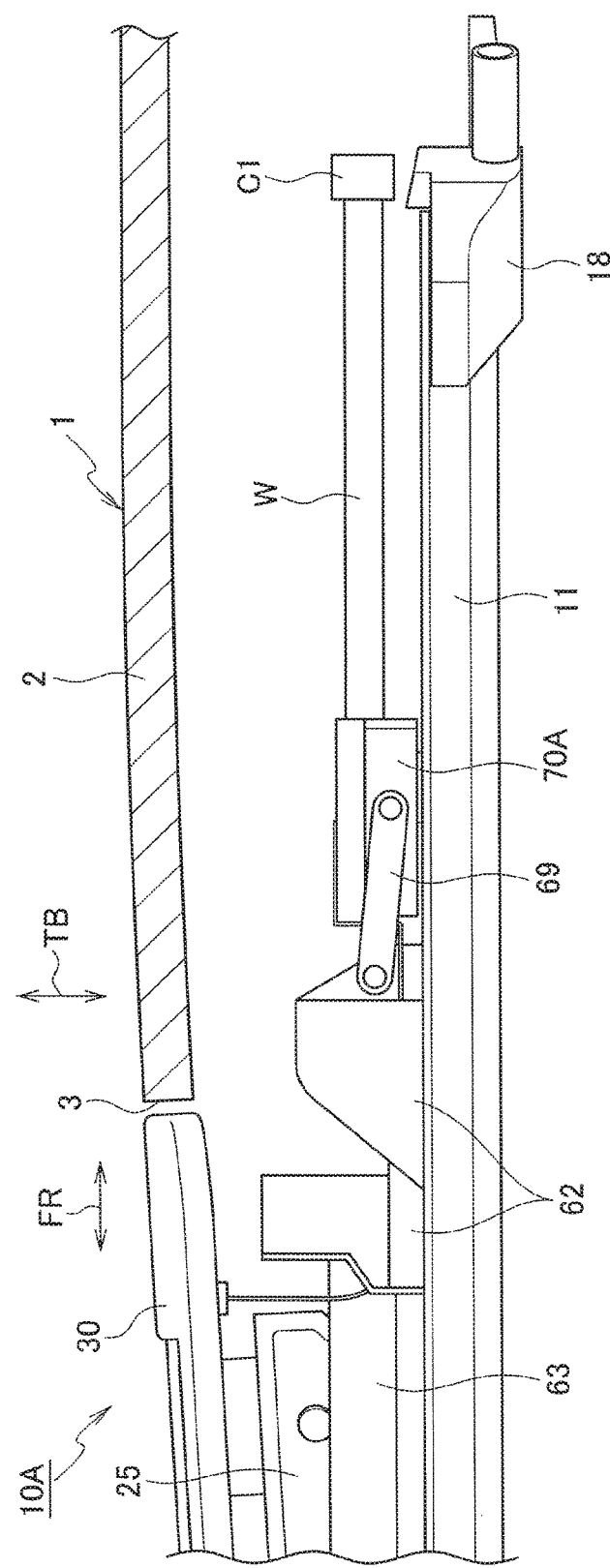
FIG. 16 is a side view of the excess length absorber according to a second embodiment in the attached state.

As shown in FIGS. 14 and 16, an excess length absorber 70A according to the second embodiment is fixed to the sunroof 30 as with the excess length absorber 70 of the first embodiment. Unlike the first embodiment, the excess length absorber 70A is connected to the water receiving body 62 of the water receiver 60 through the link 69. The link 69 is rotatably supported both by the water receiving body 62 and the excess length absorber 70A. Thus, a connected state is maintained even when the water receiving body 62 swings. The excess length absorber 70A is arranged in a position rearward of the water receiving body 62 in the front and rear direction FR of the vehicle, and is thus positioned further toward the rear in the front and rear direction FR of the vehicle than the position of the excess length absorber 70 of the first embodiment. The excess length absorber 70A is supported by the water receiving body 62 to move inside the ceiling panel 2 of the vehicle body 1 as its movement path.

The configuration of the excess length absorber 70A itself is the same as the excess length absorber 70 of the first embodiment and hence a description thereof is omitted.

In the second embodiment, as with the first embodiment, attaching the excess length absorber 70A to the sunroof 30 eliminates the need to attach the excess length absorbing parts to the vehicle body 1, which configuration enables easy attachment. Since the excess length absorber 70A is provided on the sunroof 30, the need to make space on the vehicle body 1 for installing the excess length absorbing parts is also eliminated. Furthermore, the excess length absorber 70A is provided movable together with the sunroof 30 in the position rearward of the sunroof 30 in the front and rear direction of the vehicle so that it is not exposed from the opening 3 of the ceiling panel 2. Thus, malfunctioning caused by foreign matter such as rain or dust entering within the excess length absorber 70A is prevented as much as possible.

In the second embodiment, the excess length absorber 70A is located in a position spaced apart from the opening 3 of the ceiling panel 2 and arranged so as to be hidden behind a rear wall of the water receiver 60. Thus, malfunctioning caused by foreign matter such as rain or dust entering within the excess length absorber 70A is effectively prevented.

Third Embodiment

Figure 17:
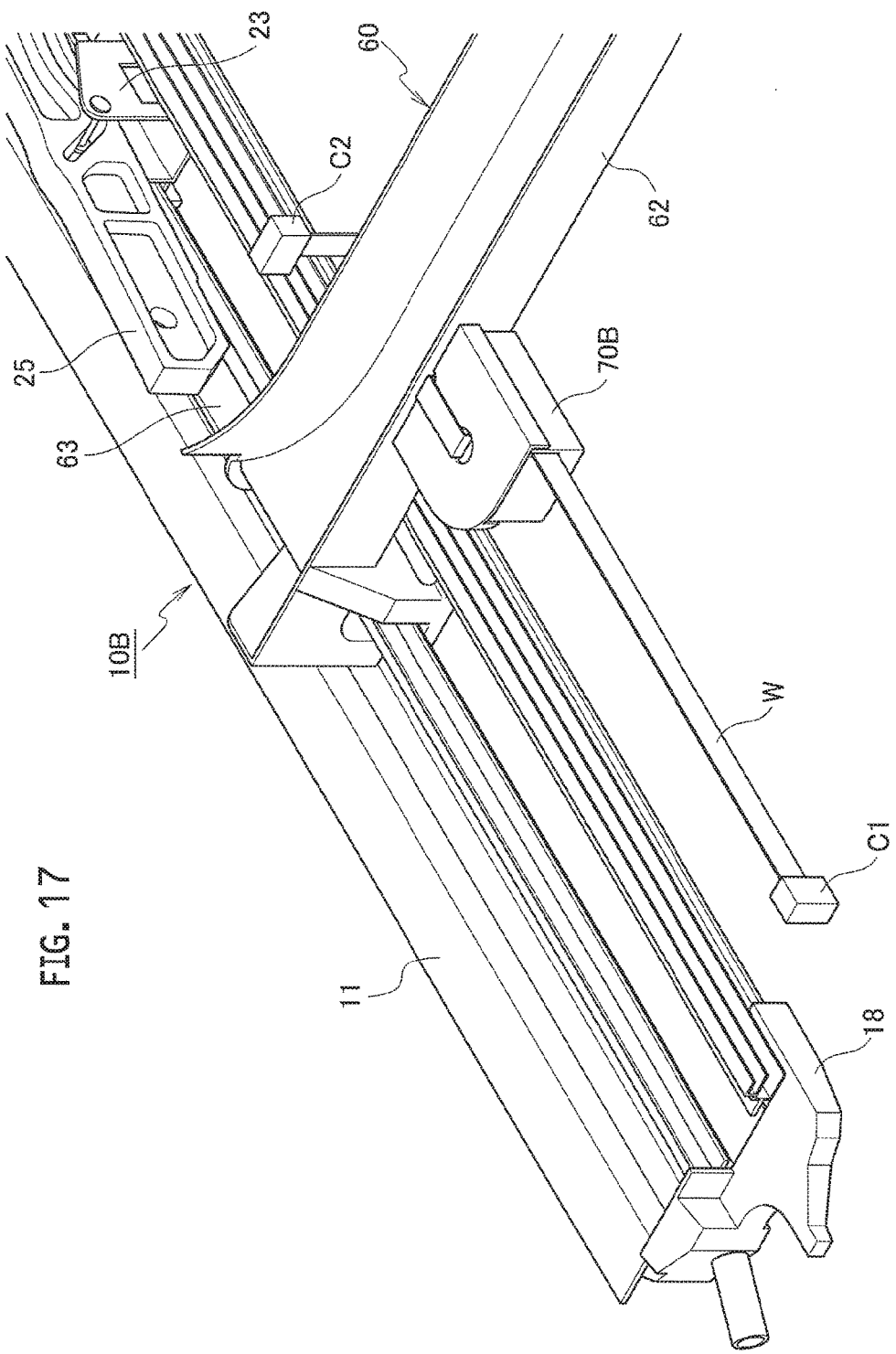
FIG. 17 is a perspective view of an excess length absorber according to a third embodiment of the present invention in an attached state.
Figure 18:
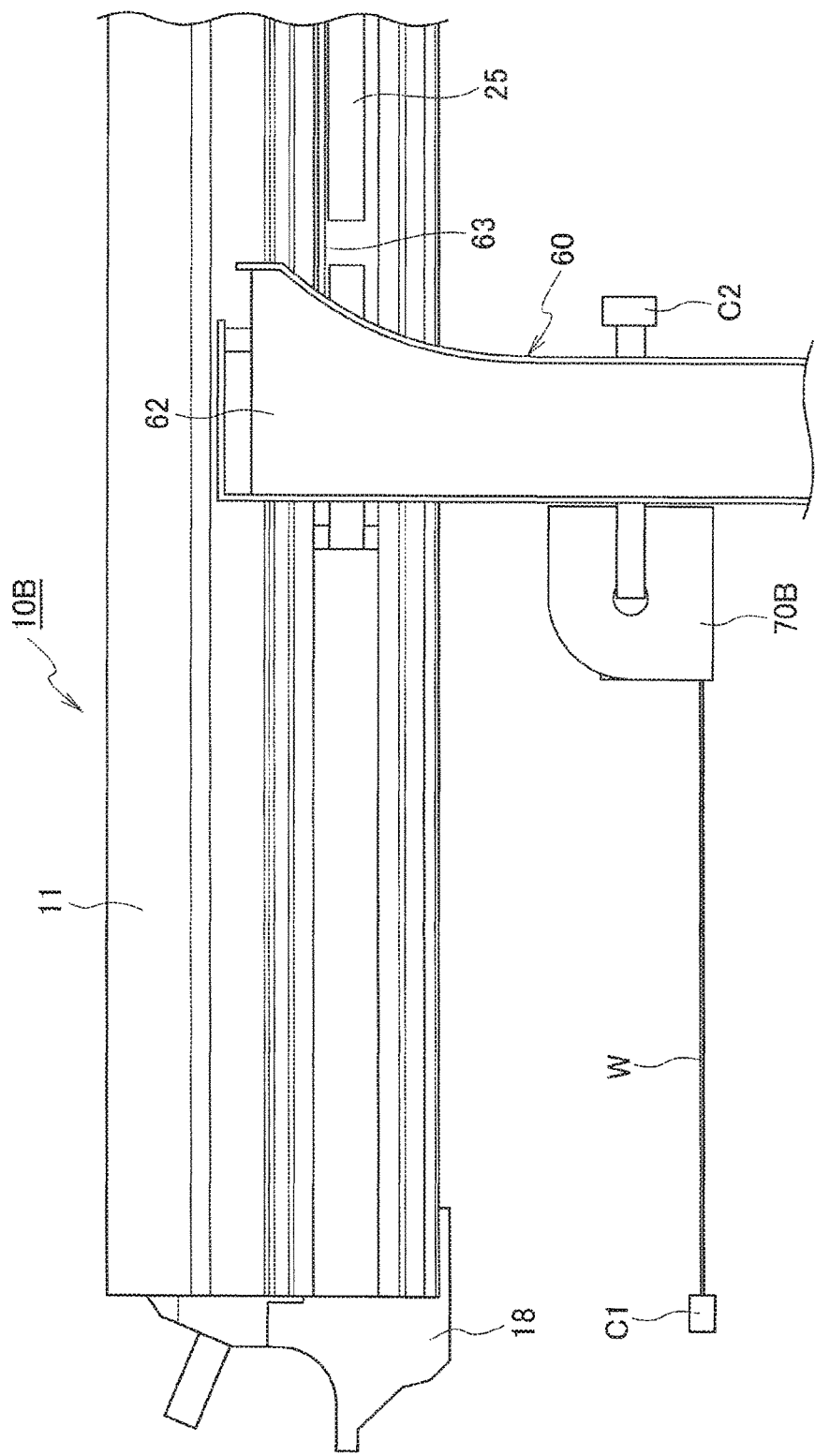
FIG. 18 is a plan view of the excess length absorber according to the third embodiment in the attached state.
Figure 19:
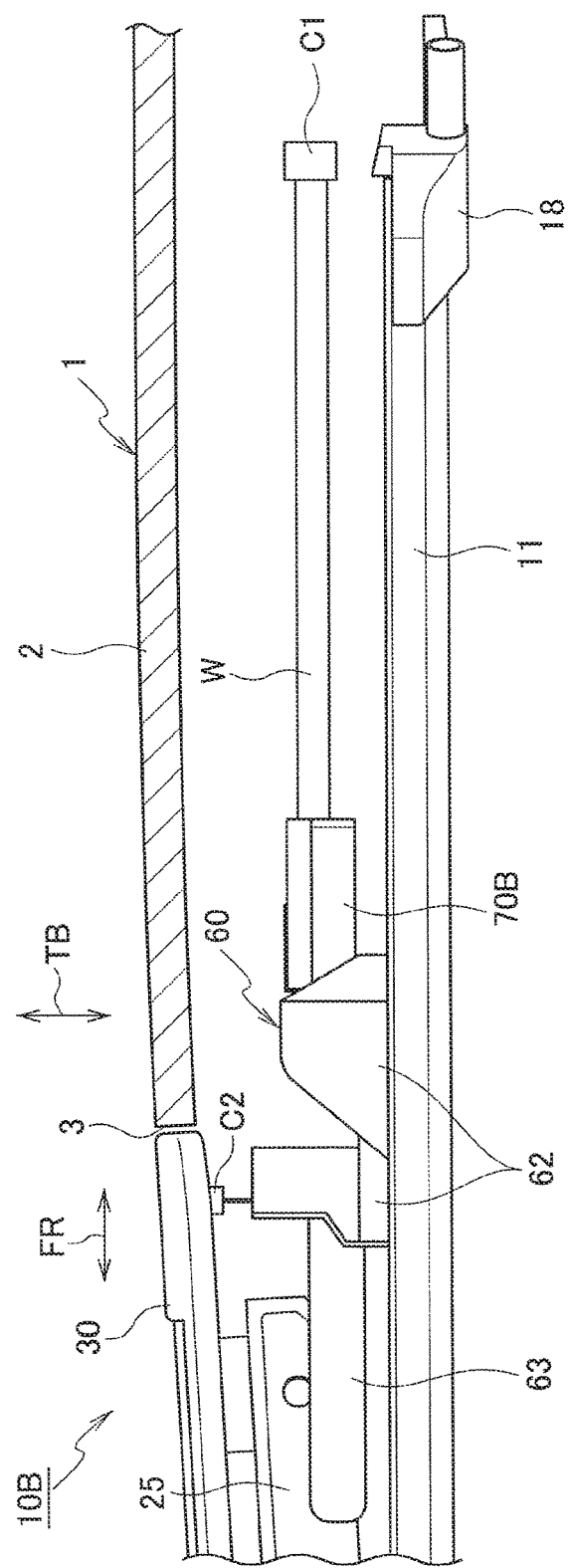
FIG. 19 is a side view of the excess length absorber according to the third embodiment in the attached state.
Figure 20:
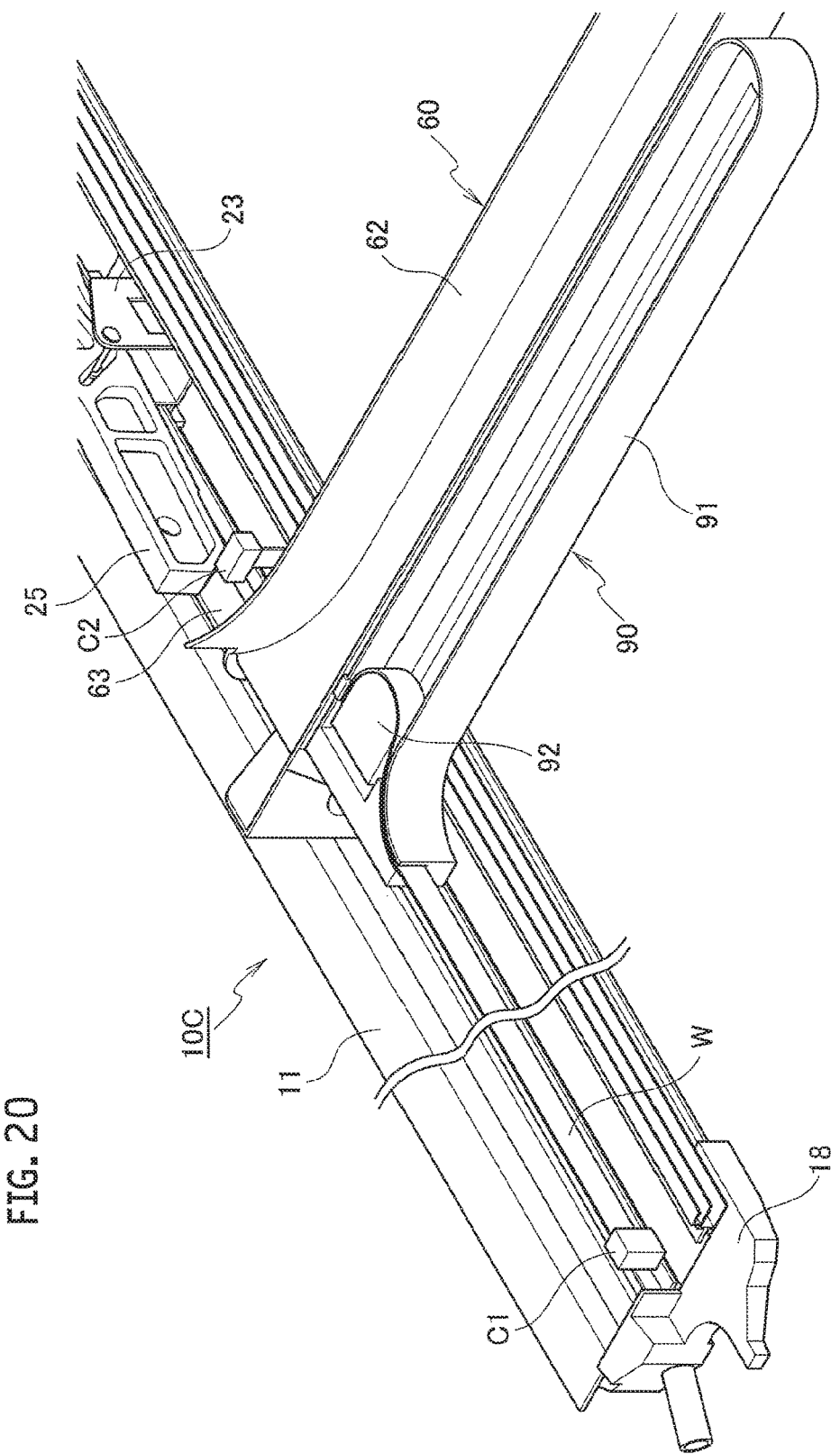
FIG. 20 is a perspective view of an excess length absorber according to a fourth embodiment of the present invention in an attached state.
Figure 21:
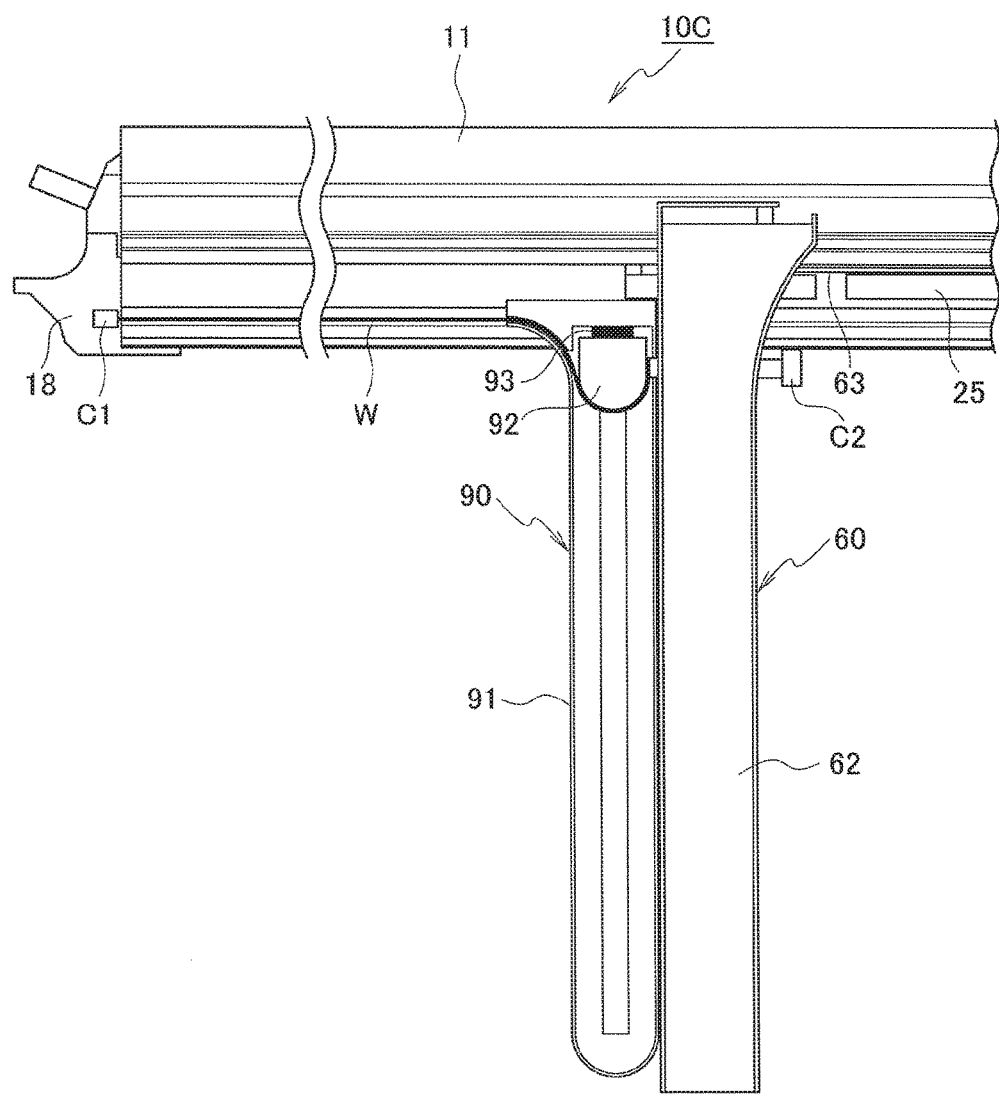
FIG. 21 is a plan view of the excess length absorber according to the fourth embodiment in the attached state.
Figure 22:
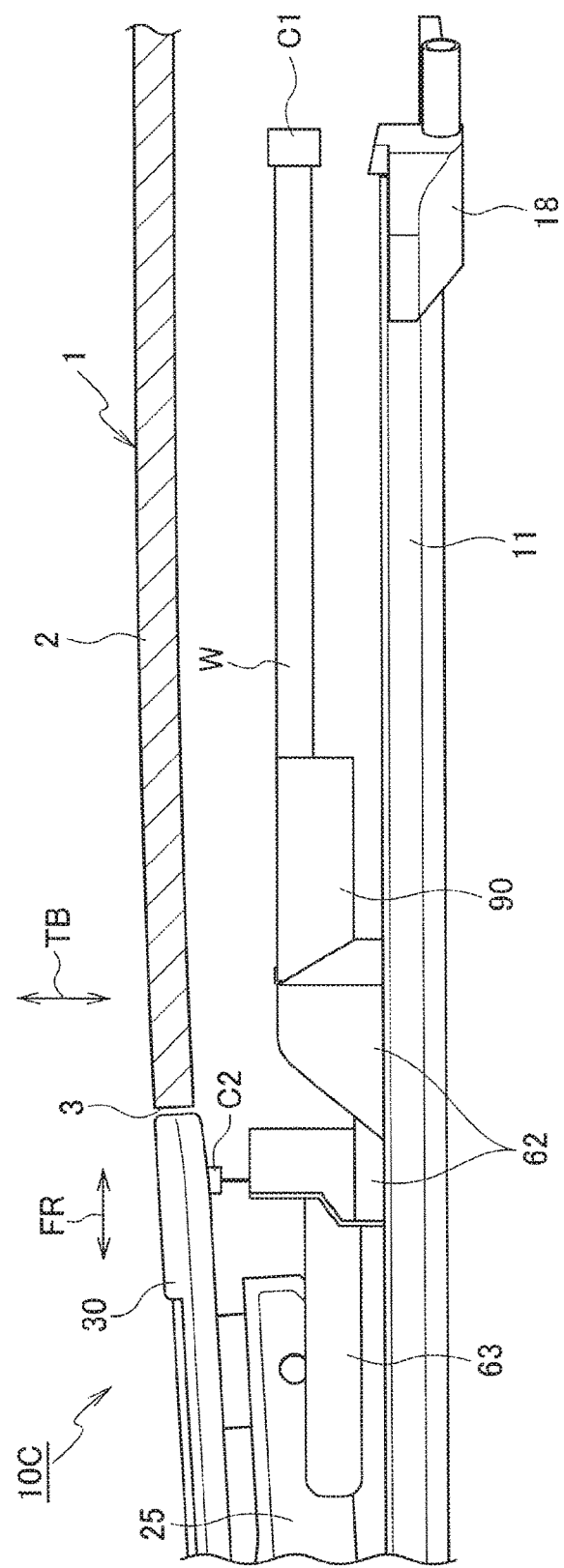
FIG. 22 is a side view of the excess length absorber according to the fourth embodiment in the attached state.

A third embodiment of the present invention is described with reference to FIGS. 17 to 19. A sunroof unit 10B according to the third embodiment has a water receiver 60 as with the sunroof unit 10A of the second embodiment. An excess length absorber 70B is integrally fixed to a rear wall of the water receiving body 62 of the water receiver 60.

The excess length absorber 70B is fixed in a position between the pair of rails 11 and not in the position above one of the rails 11. In other words, the excess length absorber 70B moves together with the sunroof 30 but does not slide along the rail 11. Thus, the excess length absorber 70B does not encounter movement resistance from the rail 11. The excess length absorber 70B is supported by the water receiving body 62 of the water receiver 60 to move inside the ceiling panel 2 of the vehicle body 1 as its movement path.

The configuration of the excess length absorber 70B itself is the same as the excess length absorber 70 of the first embodiment and hence a description thereof is omitted.

In the third embodiment, as with the first embodiment, attaching the excess length absorber 70B to the sunroof 30 eliminates the need to attach the excess length absorbing parts to the vehicle body 1, which configuration enables easy attachment. Since the excess length absorber 70B is provided on the sunroof 30, the need to make space on the vehicle body 1 for installing the excess length absorbing parts is also eliminated. Furthermore, the excess length absorber 70B is provided movable together with the sunroof 30 in the position rearward of the sunroof 30 in the front and rear direction of the vehicle so that it is not exposed from the opening 3 of the ceiling panel 2. Thus, malfunctioning caused by foreign matter such as rain or dust entering within the excess length absorber 70B can be prevented as much as possible.

In the third embodiment, as with the second embodiment, the excess length absorber 70B is located in the position spaced apart from the opening 3 of the ceiling panel 2 and arranged so as to be hidden behind the rear wall of the water receiver 60. Thus, malfunctioning caused by foreign matter such as rain or dust entering within the excess length absorber 70B is effectively prevented.

Fourth Embodiment

A fourth embodiment of the present invention is described with reference to FIGS. 20 to 23B. A sunroof unit 10C according to the fourth embodiment has a water receiver 60 as with the sunroof unit 10B of the third embodiment. An excess length absorber 90 is integrally fixed to the rear wall of the water receiving body 62 of the water receiver 60 as with the third embodiment. In other words, the excess length absorber 90 moves together with the sunroof 30 but does not slide along the rail 11. The excess length absorber 90 is supported by the water receiving body 62 to move inside the ceiling panel 2 of the vehicle body 1 as its movement path.

The configuration of the excess length absorber 90 is different from those of the excess length absorbers 70, 70A, and 70B, a description of which follows.

The excess length absorber 90 includes an excess length routing portion 91, a movable guide 92 that is arranged inside the excess length routing portion 91, and a coil spring 93, which is a biasing means that exerts a biasing force on the movable guide 92.

The excess length routing portion 91 is arranged such that a direction that is different from a longitudinal direction (front and rear direction FR of the vehicle) of the rails 11, specifically, a direction orthogonal thereto, is a routing direction of the excess length of the flat wire W. The excess length routing portion 91 has a housing length capable of routing the excess length of the flat wire W.

The movable guide 92 is arranged inside the excess length routing portion 91 and movable in the routing direction of the excess length portion of the flat wire W. The movable guide 92 has a distal end surface that is formed in a semicircular arc. The flat wire W that is drawn into the excess length routing portion 91 from a path of the rail 11 is stretched over the semicircular arc surface of the movable guide 92. Thus, with the excess length of the flat wire W being stretched over the movable guide 92, the movable guide 92 guides the excess length of the flat wire W so as to route the same along a fixed path.

The coil spring 93 biases the movable guide 92 in a direction to draw the excess length of the flat wire W into the excess length routing portion 91.

In the above configuration, when the actuator 49 activates, the pair of drive belts 40 moves so that, at one end, the pair of drive belts 40 are in the same position in the front and rear direction FR of the vehicle, thereby enabling the sunroof 30 to be changed to the three positions (refer to FIGS. 7A to 7C).

In the movement process of the sunroof 30 in the slide direction, when the sunroof 30 is moved to increase the excess length of the flat wire W (for example, when moved from the closed position of the sunroof 30 in FIG. 23A to the open position in FIG. 23B), the excess length of the flat wire W is drawn into the excess length routing portion 91 by a spring force of the coil spring 93. In the movement process of the sunroof 30 in the slide direction, when the sunroof 30 is moved to reduce the excess length of the flat wire W (for example, when moved from the open position of the sunroof 30 in FIG. 23B to the closed position in FIG. 23A), the flat wire W is dispensed from the excess length routing portion 91 against the spring force of the coil spring 93. Thus, the excess length of the flat wire W is reliably absorbed while a straight routing state is maintained for the portion of the flat wire W other than the excess length.

Power is thus constantly supplied to the sunroof 30 from a power source on the vehicle body 1 through the flat wire W for the changes between the three positions of the sunroof 30.

In the fourth embodiment, as with the first embodiment, attaching the excess length absorber 90 to the sunroof 30 eliminates the need to attach the excess length absorbing parts to the vehicle body 1, which configuration enables easy attachment. Since the excess length absorber 90 is provided on the sunroof 30, the need to make space on the vehicle body 1 for installing the excess length absorbing parts is also eliminated. Furthermore, the excess length absorber 90 is provided movable together with the sunroof 30 in the position rearward of the sunroof 30 in the front and rear direction of the vehicle so that is not exposed from the opening 3 of the ceiling panel 2. Thus malfunctioning caused by foreign matter such as rain or dust entering within the excess length absorber 90 can be prevented as much as possible.

In the fourth embodiment, as with the second and third embodiments, the excess length absorber 90 is located in the position spaced apart from the opening 3 of the ceiling panel 2 and arranged so as to be hidden behind the rear wall of the water receiver 60. Thus, malfunctioning caused by foreign matter such as rain or dust entering within the excess length absorber 90 is effectively prevented.

The excess length routing portion 91 is arranged such that the direction that is different from the longitudinal direction of the rails 11 is the routing direction of the excess length of the flat wire W, and the movable guide 92 is configured to move in the routing direction of the excess length of the flat wire W. Consequently, the excess length absorber 90 has great installation flexibility since it can be installed in any direction as long as the excess length absorbing direction of the flat wire W is a direction other than the longitudinal direction of the rails 11.

Variation

In each of the above embodiments, the sunroof 30 has the dimming panel, and power feeding to the dimming panel has been described. However, in a case in which the sunroof 30 is provided with a touch sensor to prevent pinching caused by the sunroof 30, the present invention may also be used to feed power to this touch sensor. When the touch sensor detects an object or the like, a drive motor of the sunroof 30 is controlled to be reversed. An illumination (LED illumination) mounted on the sunroof 30 may also be a device to be powered on the sunroof 30.

In each of the above embodiments, the electric wire is the flat wire W that makes winding and forming a spiral form easy. However, the electric wire may be of any form, such as a cable having a round cross-section.

In the first to fourth embodiments, the excess length absorbers 70, 70A, 70B, and 90 are laid on their sides with a vertical axis of rotation and a flat surface of the flat wire W is drawn in a vertical orientation (upright). However, the excess length absorbers 70, 70A, 70B, and 90 may be arranged vertically with a horizontal axis of rotation and the flat surface of the flat wire W drawn in a horizontal orientation (sideways), or may be arranged in other orientations.

In each of the above embodiments, a solar panel may be employed instead of a movable glass. In this case, the electric wire (for example, the flat wire W) may also be used to feed power toward the vehicle body 1 from the solar panel (movable body).

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A sunroof feed structure comprising:
a rail fixed to a vehicle body of a vehicle;
a slider movable along the rail in a front and rear direction of the vehicle;
a sunroof supported by the slider, movable inside a ceiling panel of the vehicle body as a movement path, and capable of opening and closing an opening of the ceiling panel;
an electric wire for power feeding between the vehicle body and the sunroof, the electric wire having one end fixed to the vehicle body and the other end fixed to the sunroof; and
an excess length absorber for winding an excess length of the electric wire, the excess length absorber being movable together with the sunroof in a position rearward of the sunroof in the front and rear direction of the vehicle.

2. The sunroof feed structure according to claim 1, wherein the excess length absorber is slidably arranged on the rail.

3. The sunroof feed structure according to claim 1, further comprising a swingable link connecting the excess length absorber to the sunroof.

4. The sunroof feed structure according to claim 1, further comprising a water receiver connected to a rear end of the sunroof in the front and rear direction of the vehicle,
wherein the excess length absorber is arranged in a position rearward of the water receiver in the front and rear direction of the vehicle.

5. The sunroof feed structure according to claim 4, wherein the excess length absorber is integrally fixed to the water receiver.

6. The sunroof feed structure according to claim 1, wherein the excess length absorber is fixed to the sunroof in a position rearward of the sunroof in the front and rear direction of the vehicle.

7. The sunroof feed structure according to claim 1, wherein the rail includes a slide guide channel, a belt guide channel, and a drainage channel.

8. The sunroof feed structure according to claim 7, the sunroof feed structure further comprising a drive belt disposed in the belt guide channel and configured to move the sunroof.

9. The sunroof feed structure according to claim 1, the sunroof feed structure further comprising a deflector body disposed across a width of an opening of the ceiling panel of the vehicle.

10. The sunroof feed structure according to claim 1, wherein the excess length absorber includes a case, a spiral spring disposed inside the case, and a twist-preventing electric wire housing portion disposed on an inner circumferential side of the case of the excess length absorber,
wherein the twist-preventing electric wire housing portion includes a support shaft extending upwards from the inner circumferential side of the case of the excess length absorber, the support shaft including a slit.

11. The sunroof feed structure according to claim 4, wherein the water receiver is disposed across a width of the sunroof in a direction perpendicular to the front and rear direction of the vehicle.

* * * * *